(12) United States Patent
Kim et al.

(10) Patent No.: US 12,046,763 B2
(45) Date of Patent: Jul. 23, 2024

(54) BATTERY MODULE

(71) Applicant: SK On Co., Ltd., Seoul (KR)

(72) Inventors: Dong Jin Kim, Daejeon (KR); Jeong Woon Ko, Daejeon (KR); Seul Gi Shin, Daejeon (KR); Seo Roh Rhee, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 17/576,385

(22) Filed: Jan. 14, 2022

(65) Prior Publication Data
US 2022/0223959 A1 Jul. 14, 2022

(30) Foreign Application Priority Data

Jan. 14, 2021 (KR) .................. 10-2021-0005306
Sep. 15, 2021 (KR) .................. 10-2021-0123342

(51) Int. Cl.
*H01M 50/291* (2021.01)
*H01M 10/04* (2006.01)
(Continued)

(52) U.S. Cl.
CPC ..... *H01M 50/211* (2021.01); *H01M 10/0481* (2013.01); *H01M 50/178* (2021.01); *H01M 50/291* (2021.01)

(58) Field of Classification Search
CPC .................................................. H01M 50/211
See application file for complete search history.

(56) References Cited

U.S. PATENT DOCUMENTS

2006/0176014 A1* 8/2006 Moon ................ H01M 50/209
　　　　　　　　　　　　　　　　　　　　　　　320/112
2010/0112436 A1   5/2010 Mizuta et al.
(Continued)

FOREIGN PATENT DOCUMENTS

CN    101048890 A    10/2007
CN    101617419 A    12/2009
(Continued)

OTHER PUBLICATIONS

Extended European Search Report for European Patent Application No. 22151376.5 issued by the European Patent Office on Jun. 13, 2022.
(Continued)

*Primary Examiner* — Maria Laios
*Assistant Examiner* — Jordan E Berresford
(74) *Attorney, Agent, or Firm* — IP & T GROUP LLP

(57) ABSTRACT

A battery module includes: a plurality of secondary battery cells, each including an electrode lead connected to an electrode assembly, a terrace portion forming a periphery of a cell body member in which the electrode assembly is accommodated, and a sealing portion formed to be connected to the terrace portion; a housing in which the plurality of secondary battery cells are accommodated; and a guard unit installed to face at least a portion of the terrace portion and at least a portion of the sealing portion to delay bursting of the sealing portion of at least one of the secondary battery cells. In the guard unit, a gap between internal surfaces facing the terrace portion is formed to be smaller than a thickness of the cell body member to limit expansion thickness of the terrace portion.

22 Claims, 16 Drawing Sheets

(51) Int. Cl.
*H01M 50/178* (2021.01)
*H01M 50/211* (2021.01)

(56) References Cited

U.S. PATENT DOCUMENTS

| | | |
|---|---|---|
| 2013/0216873 A1 | 8/2013 | Schaefer |
| 2014/0023887 A1 | 1/2014 | Lim |
| 2015/0064540 A1* | 3/2015 | Roh ............... H01M 50/262 |
| | | 429/153 |
| 2015/0333358 A1 | 11/2015 | Haraguchi et al. |
| 2016/0315301 A1 | 10/2016 | Kim et al. |
| 2018/0006281 A1* | 1/2018 | Eom ............... H01M 50/20 |
| 2018/0006284 A1 | 1/2018 | Tsuchiya et al. |
| 2018/0053975 A1 | 2/2018 | Lee et al. |
| 2019/0198952 A1 | 6/2019 | Choi et al. |
| 2019/0312319 A1 | 10/2019 | Choi et al. |
| 2019/0372083 A1 | 12/2019 | Ryu et al. |
| 2020/0006823 A1 | 1/2020 | Chung et al. |
| 2020/0067040 A1* | 2/2020 | Kim ............... H01M 50/507 |
| 2020/0243936 A1* | 7/2020 | Cho ............... H01M 50/211 |
| 2020/0343604 A1 | 10/2020 | Lee et al. |
| 2020/0388891 A1 | 12/2020 | Choi et al. |
| 2021/0359357 A1 | 11/2021 | Chung et al. |
| 2021/0367290 A1 | 11/2021 | Kasai et al. |

FOREIGN PATENT DOCUMENTS

| | | | |
|---|---|---|---|
| CN | 103140956 A | 6/2013 | |
| CN | 104956512 A | 9/2015 | |
| CN | 107210404 A | 9/2017 | |
| CN | 107546342 A | 1/2018 | |
| CN | 209401694 U | 9/2019 | |
| CN | 110676536 A | 1/2020 | |
| CN | 110854319 A | 2/2020 | |
| CN | 111247689 A | 6/2020 | |
| DE | 102013012643 A1 * | 2/2015 | ............ H01M 50/10 |
| DE | 102013012643 A1 | 2/2015 | |
| KR | 10-2016-0126157 A | 11/2016 | |
| KR | 10-2017-0086766 A | 7/2017 | |
| KR | 10-2018-0067323 A | 6/2018 | |
| KR | 10-1866355 B1 | 6/2018 | |
| KR | 10-2019-0004641 A | 1/2019 | |
| KR | 10-2019-0012998 A | 2/2019 | |
| KR | 10-2020-0003600 A | 1/2020 | |
| KR | 10-2065102 B1 | 1/2020 | |
| KR | 10-2096983 B1 | 4/2020 | |
| KR | 10-2020-0078450 A | 7/2020 | |
| KR | 10-2020-0125184 A | 11/2020 | |
| KR | 10-2020-0140476 A | 12/2020 | |
| WO | 2015014486 A1 | 2/2015 | |
| WO | 2019/171575 A1 | 9/2019 | |

OTHER PUBLICATIONS

Office Action on the Chinese Patent Application No. 202210041079.7 issued by the Chinese Patent Office on Jun. 21, 2023.

* cited by examiner

"A"

BATTERY MODULE

CROSS-REFERENCE TO RELATED APPLICATION(S)

This application claims the benefit under 35 USC 119(a) of Korean Patent Application Nos. 10-2021-0005306 filed on Jan. 14, 2021 and 10-2021-0123342 filed on Sep. 15, 2021 in the Korean Intellectual Property Office, the entire disclosures of which are incorporated herein by reference for all purposes.

BACKGROUND

1. Field

The present disclosure relates to a secondary battery module.

2. Description of the Background

As technological developments and demand for mobile devices, electric vehicles, and the like increase, demands for secondary battery cells as an energy source are rapidly increasing. A secondary battery cell is a battery that can be repeatedly charged and discharged because conversion between chemical energy and electrical energy thereof is reversible.

Such a secondary battery cell typically includes an electrode assembly including a cathode, an anode, a separator, an electrolyte, and the like, and a laminated film casing for protecting the electrode assembly.

A plurality of secondary battery cells may be mounted and installed as a secondary battery module (also may be referred to as battery module) in an electric vehicle, an energy storage system (ESS), or the like.

The electrode assembly may generate heat during a charging or discharging process, and the generation of heat may cause an increase in temperature, resulting in a deterioration of performance of the secondary battery cell.

In addition, if gas is generated in a secondary battery cell due to some malfunction such as an excessive increase in the temperature of the secondary battery cell, the pressure inside the secondary battery cell may be increased and may cause the secondary battery cell to explode which in turn may cause successive explosions of other secondary battery cells in the battery module.

For example, as gas is generated inside a secondary battery cell, a terrace portion of the secondary battery cell may swell first, and then a sealing portion (a welding portion) of the secondary battery cell may also swell and burst.

In a battery module according to the related art, venting caused by bursting of a sealing portion occurs at relatively high speed after the terrace portion starts to swell. For example, a terrace portion of a secondary battery cell may swell, and a sealing portion may then be opened (exploded) rapidly by the force applied from the swelling terrace to the sealing portion.

When venting due to the opening (or bursting) of the sealing portion occurs, an electrolyte in the secondary battery cell is evaporated to rapidly decrease capacity of the secondary battery cell, so that the lifespan of the secondary battery cell and the battery module are significantly reduced.

SUMMARY

An aspect of the present disclosure is to provide a battery module which may delay venting of gas inside a secondary battery cell.

According to an aspect of the present disclosure, a battery module includes: a plurality of secondary battery cells, each including an electrode lead connected to an electrode assembly, a terrace portion forming a periphery of a cell body member in which the electrode assembly is accommodated, and a sealing portion formed to be connected to the terrace portion; a housing in which the plurality of secondary battery cells are accommodated; and a guard unit installed to face at least a portion of the terrace portion and at least a portion of the sealing portion to delay bursting of the sealing portion of at least one of the secondary battery cells. In the guard unit, a gap between internal surfaces facing the terrace portion is formed to be smaller than a thickness of the cell body member to limit expansion thickness of the terrace portion.

In the guard unit, a gap between internal surfaces facing the sealing portion may be formed to be smaller than the thickness of the cell body member.

In the guard unit, a gap between internal surfaces facing the sealing portion may be formed to be smaller than the gap between the internal surfaces facing the terrace portion.

In the guard unit, an average gap between internal surfaces facing the sealing portion may be formed to be smaller than an average gap between the internal surfaces facing the terrace portion.

The guard unit may have a shape facing half or more of a total length of the terrace portion and the sealing portion, in a length direction of the cell body member.

The guard unit may be installed to face an entirety of the sealing portion, based on a length direction of the cell body member.

The guard unit may include: a first block member in which a slit hole, into which the sealing portion is inserted, is formed; and a second block member in which an opening is formed to face at least a portion of the terrace portion. A gap between the sealing portion and an internal surface of the slit hole may be smaller than a gap between the terrace portion and an internal surface of the opening.

The gap between the sealing portion and the internal surface of the slit hole may be equal to at least 0.5 times or less of a length at which the sealing portion is inserted into the slit hole.

In the second block member, a corner, adjacent to the cell body member, of a portion facing the terrace portion may be formed to have a round shape.

The second block member may be provided on opposite sides of the terrace portion.

The guard unit may include: an extension guide member elastically moved in a thickness direction of the cell body member according to expansion of the terrace portion; and a movement of the extension guide member is limited within a range smaller than a thickness of the cell body member to limit expansion thickness of the terrace portion.

The guard unit may further include: a first block member in which a slit hole, into which the sealing portion is inserted, is formed; and a second block member in which an opening is formed to face at a portion of the terrace portion. The extension guide member may have one end portion, coupled to the first block member, and the other end portion extending to the second block member.

The guard unit may further include: a needle member coupled to the second block member, protruding in a direction of the terrace portion, and disposed to pass through a through-hole, formed in the extension guide member, to perforate the terrace portion.

The needle member may be provided in a form of a tube in which an internal hollow is formed, and an introduction hole may be formed to be perforated in a front tip portion of the needle member and a discharge hole may be formed in a central portion of the needle member such that the internal hollow communicates with an external entity.

The guard unit may further include: a reinforcing pad member provided on one surface of the extension guide member facing the terrace portion and applied with an adhesive material bonding the expanding terrace portion.

The guard unit may further include: a holding member, provided on the second block member, on which the other end portion of the extension guide member moved in a direction of the second block member is locked to be fixed.

The guard unit may be installed to face a portion, in which the electrode lead is disposed, of the sealing portion.

According to an aspect of the present disclosure, a battery module include: a plurality of secondary battery cells, each including an electrode lead connected to an electrode assembly, a terrace portion forming an periphery of a cell body member in which the electrode assembly is accommodated, and a sealing portion formed to be connected to the terrace portion; a housing in which the plurality of secondary battery cells are accommodated; a guard unit installed to face at least a portion of the terrace portion and at least a portion of the sealing portion to delay bursting of the sealing portion of the secondary battery cell and integrated to correspond to each of the plurality of secondary battery cells; and at least one bus bar member in which the integrated guard unit is embedded. The guard unit is formed such that a gap between internal surfaces facing the terrace portion is formed to be smaller than a thickness of the cell body member to limit expansion thickness of the terrace portion. The electrode leads of the plurality of secondary battery cells are electrically connected to the bus bar member.

According to an aspect of the present disclosure, a battery module includes: a plurality of secondary battery cells, each including an electrode lead connected to an electrode assembly, a terrace portion forming an periphery of a cell body member in which the electrode assembly is accommodated, and a sealing portion formed to be connected to the terrace portion; a housing in which the plurality of secondary battery cells are accommodated; and a guard unit installed to face at least a portion of the terrace portion and at least a portion of the sealing portion to delay bursting of the sealing portion of at least one of the secondary battery cells. In the guard unit, a space for expansion of the sealing portion is formed to be smaller than a space for expansion of the terrace portion.

In the guard unit, a gap between internal surfaces, respectively corresponding to the terrace portion and the sealing portion, is formed to be smaller than a thickness of the cell body member.

According to an aspect of the present disclosure, a battery module includes: a housing for accommodating a plurality of secondary battery cells, each of the secondary battery cells including an electrode assembly and a cell body member including a terrace portion and a sealing portion enclosing the electrode assembly, and a guard unit positioned around the terrace portion and the sealing portion of the cell body member, the guard unit being suitable for delaying bursting of the sealing portion of the secondary battery cells.

BRIEF DESCRIPTION OF DRAWINGS

The above and other aspects, features, and advantages of the present disclosure will be more clearly understood from the following detailed description, taken in conjunction with the accompanying drawings.

FIG. 11A illustrates the guard unit and the secondary battery cell illustrated in FIG. 2, and FIGS. 11B and 11C illustrate a modified example in which a height of the guard unit is increased, as compared with FIG. 11A.

DETAILED DESCRIPTION

Figure 1A:
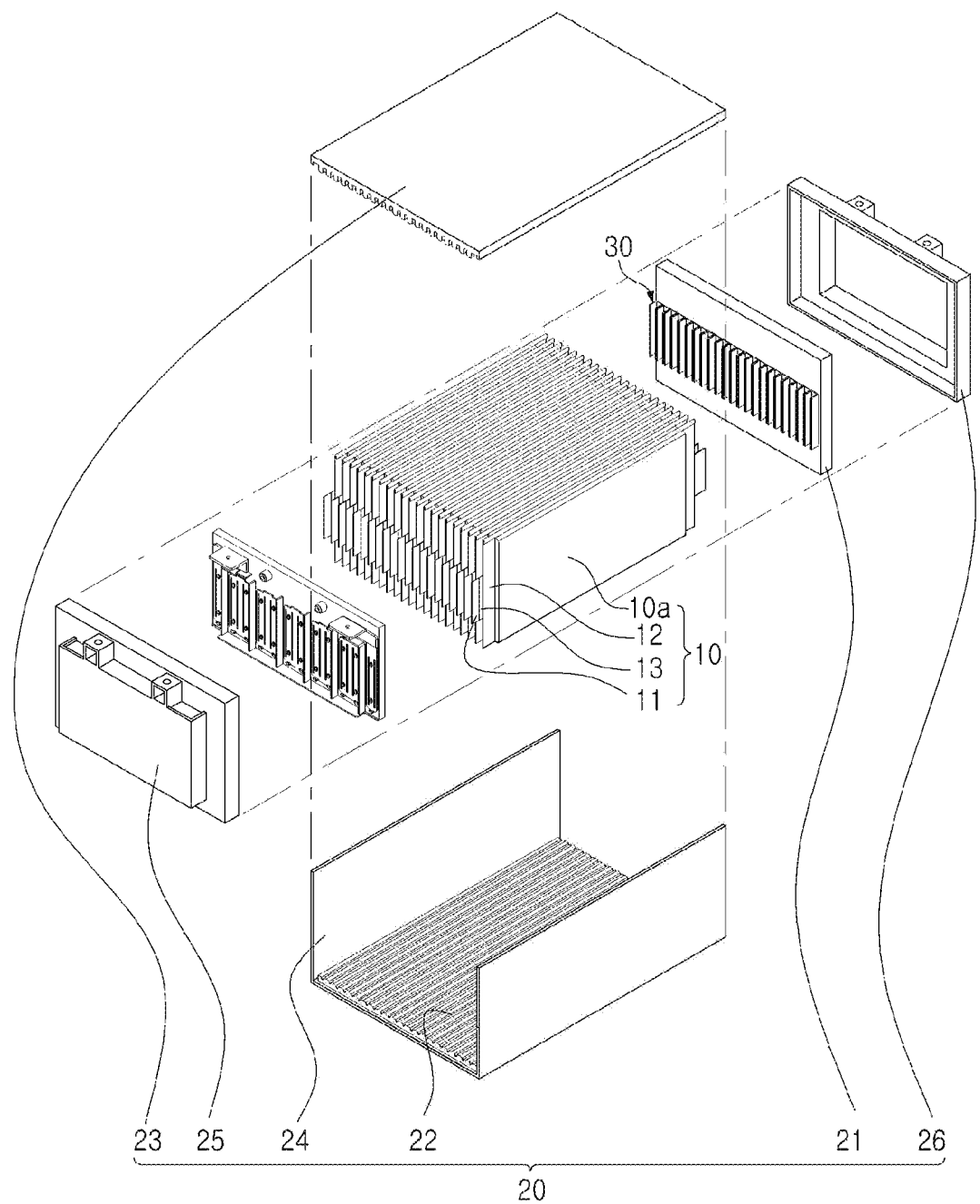
FIG. 1A is an exploded perspective view of a battery module according to an example embodiment of the present disclosure.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the appropriate method he or she knows for carrying out the present disclosure. Therefore, the configurations described in the embodiments and drawings of the present disclosure are merely appropriate embodiments but do not represent all of the technical spirit of the present disclosure. Thus, the present disclosure should be construed as including all the changes, equivalents, and substitutions included in the spirit and scope of the present disclosure at the time of filing this application.

Hereinafter, embodiments of the present disclosure will be described in detail with reference to the accompanying drawings. In this case, it is to be noted that like reference numerals denote like elements in appreciating the drawings. Moreover, detailed descriptions related to well-known functions or configurations will be ruled out in order not to unnecessarily obscure the subject matter of the present disclosure. Based on the same reason, it is to be noted that some components shown in the drawings are exaggerated, omitted or schematically illustrated, and the size of each component does not exactly reflect its actual size.

Hereinafter, example embodiments of the present disclosure will now be described in detail with reference to the accompanying drawings.

Figure 1B:
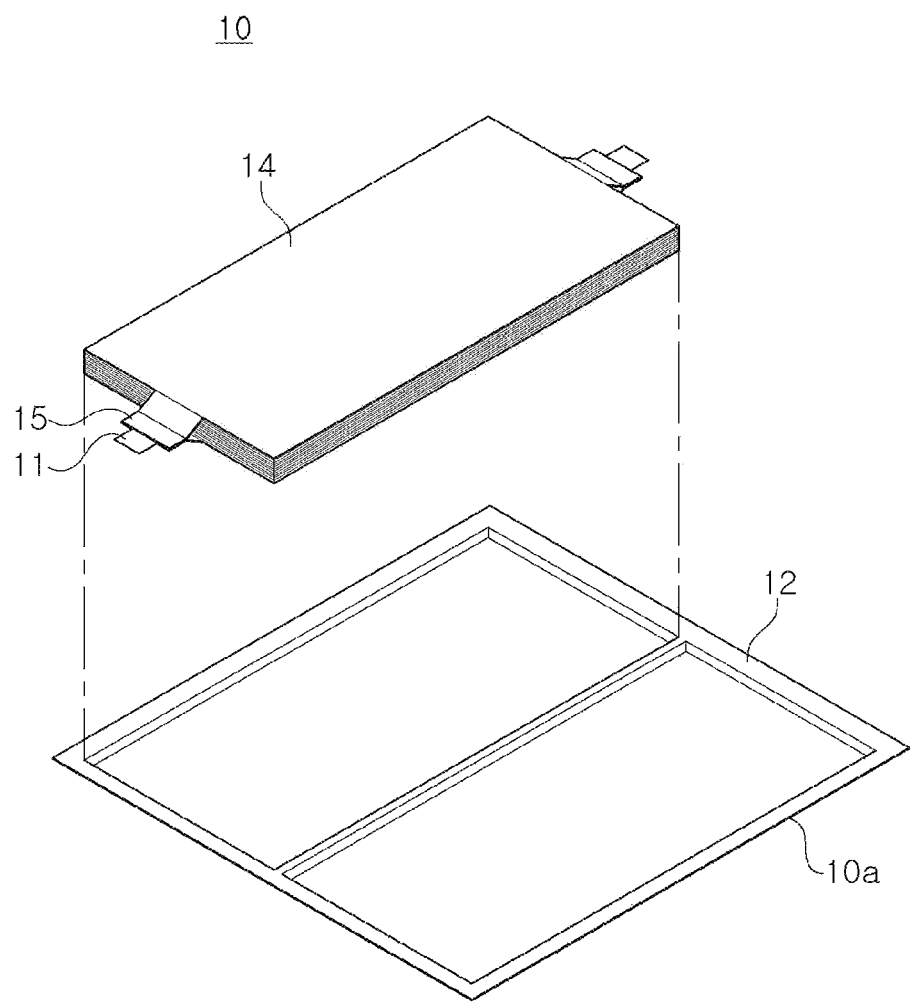
FIG. 1B is an perspective view of a secondary battery cell in a state before enclosing the electrode assembly into a cell body member according to an example embodiment of the present disclosure.

FIG. 1A is an exploded perspective view of a battery module according to an example embodiment of the present disclosure, and FIG. 1B is an perspective view of a secondary battery cell in a state before enclosing the electrode assembly into a cell body member according to an example embodiment of the present disclosure. Referring to the drawing, a battery module according to an example embodiment may include a plurality of secondary battery cells 10, a housing 20, and a guard unit 30.

The plurality of secondary battery cells 10 may include a cell body member 10a in which the electrode assembly 14 is accommodated, an electrode lead 11 connected to a electrode tab 15 of the electrode assembly 14, a terrace portion 12 forming an periphery of the cell body member 10a and being a portion in which pouch-type members accommodating the electrode assembly 14 are in contact with each other, and a sealing portion (a welding portion) 13, connected to an external side of the terrace portion 12, in which the pouch-type members are in contact with each other to be sealed or thermally welded. The terrace portion 12 and the sealing portion 13 may form an edge of the cell body member 10a. The sealing portion 13 may be disposed between the electrode lead 11 and a cell body member 10a exposed outwardly. The housing 20 may include at least one bus bar member 21 to which the electrode lead 11 is coupled. The bus bar member 21 may be electrically connected to the electrode leads 11 of the plurality of secondary battery cells 10. A plurality of secondary battery cells 10 may be accommodated inside the housing 20 in the state of being stacked. As an example, the guard unit 30 may be provided on the bus bar member 21. The guard unit 30 may delay swelling or bursting of the sealing portion 13 when gas is generated in the secondary battery cell 10. The guard unit 30 may have an integrated structure to correspond to each of the plurality of secondary battery cells 10, and the integrated guard unit 30 may be installed on the bus bar member 21. For example, the integrated guard unit 30 may be at least partially embedded in the bus bar member 21.

Accordingly, the guard unit 30 of the battery module according to an example embodiment may delay venting of gas caused by bursting of the sealing portion 13 of the secondary battery cell 10. Thus, a battery module according to the present disclosure may delay explosion of the secondary battery cell 10 caused by the venting of gas.

In addition, as the battery module according to the present disclosure delays a point in time at which the sealing portion 13 bursts, the battery module may also delay a point in time, at which the electrolyte in the secondary battery cell 10 is evaporated, thus suppressing a rapid decrease in the capacity of the secondary battery cell.

As an example, under a condition that the secondary battery cell 10 is fully charged at a temperature of 60° C., a battery module according to the related art has a lifespan of about 42 days, whereas the battery module according to the present disclosure exhibited a lifespan of about 191 days. Thus, it was found that a battery module according to an example embodiment of the present disclosure demonstrates a significantly improved lifespan when compared to existing battery modules.

The secondary battery cell 10 may include an electrode assembly 14 and a cell body member 10a surrounding the electrode assembly 14.

The electrode assembly 14 may substantially include an electrolyte, and the electrolyte may be accommodated in the cell body member 10a and used together with the electrode assembly 14. The electrolyte may include a lithium salt, such as $LiPF_6$ or $LiBF_4$, in an organic solvent, such as ethylene carbonate (EC), propylene carbonate (PC), diethyl carbonate (DEC), ethyl methyl carbonate (EMC), or dimethyl carbonate (DMC). Furthermore, the electrolyte may be in a liquid, solid or gel phase.

The cell body member 10a is a component protecting the electrode assembly 14 while accommodating the electrolyte therein. The cell body member 10a may be provided, for example, as a pouch-type member. In another example, the cell body member 10a may be provided as a can-type member. The pouch-type member may be a film casing accommodating and fully enclosing the electrode assembly 14. The film casing may be sealed on three or four sides and may fully cover the electrode assembly 14. For example, the film casing may be sealed on three sides of the electrode assembly 14, usually an upper side and both lateral sides except one side (for example, a lower side) in a state in which the electrode assembly 14 is accommodated in an accommodation space formed inside the film casing. The can-type member may be in the form of sealing the electrode assembly 14 by overlapping and bonding the can-type member on one side of the electrode assembly 14, and may be a component configured to one surface, usually an upper surface, in a state in which the electrode assembly 14 is accommodated in the can-type member.

However, such a pouch-type secondary battery cell 10 or such a can-type secondary battery cell 10 is merely an example of the secondary battery cell 10 accommodated in the battery module according to the present disclosure, and the secondary battery cell 10 accommodated in the battery module according to the present disclosure is not limited to the above-described type.

The secondary battery cell 10 may include a terrace portion 12 forming a periphery of the cell body member 10a surrounding the electrode assembly 14. The periphery of the cell body member 10a may be a portion that a film casing overlaps. In addition, the secondary battery cell 10 may be provided with a sealing portion 13 sealing or thermally welding the overlapping portion of the film casing.

In the detailed description and claims, the terrace portion 12 is defined to refer to a portion of the periphery of the cell body member 10a, except for the sealing portion 13. For example, the periphery or edge of the cell body member 10a (the portion that the film casing overlaps) may include a terrace portion 12 and a sealing portion 13 connected to the terrace portion 12.

The electrode lead 11 is exposed outwardly of the film casing through the terrace portion 12 and the sealing portion 13.

The sealing portion 13 may be sealed (thermally welded) to an external side of the terrace portion 12 to seal the edge of the cell body member 10a. In addition, in a portion where the electrode lead 11 is disposed, the sealing portion 13 may seal the electrode lead 11 together with the edge of the cell body member 10a.

The term "being sealed (thermally welded)" may refer a state in which the sealing portion 13 is solidified and pressurized after being melted by heat or the like. In addition, the sealing portion 13 may be sealed with an adhesive material such as a sealant.

In addition, the secondary battery cell 10 of the battery module according to an example embodiment may include an insulating member (not illustrated) disposed between the edge of the cell body member 10a (the portion with which the film casing is in contact and overlaps) and the electrode lead 11. For example, the insulating member may have a structure covering the electrode lead 11. Accordingly, the edge of the cell body member 10a may be electrically separated from the electrode lead 11 to be insulated therefrom.

The housing 20 may serve as a body of a battery module in which the plurality of secondary battery cells 10 are accommodated.

For example, the housing 20 may have a configuration in which a plurality of secondary battery cells 10 are installed, and may serve to transfer electrical energy, generated by the secondary battery cell 10, to an external entity or to transfer external electrical energy to the secondary battery cell 10.

To this end, the housing 20 may include a bus bar member 21, connected to the electrode lead 11 of the secondary battery cell 10 to electrically connect the secondary battery cell 10 to an external entity, or the like.

Also, the housing 20 may include a bottom member 22 accommodating the plurality of secondary battery cells 10.

The bottom member 22 may include an insulating member applied to a front end portion and a rear end portion coupled to the bus bar member 21. The insulating member may also be attached in the form of a sheet. This is aimed at securing insulating properties of the bus bar member 21.

In addition, the bottom member 22 may be configured such that a heat transfer material is applied to a portion in contact with the secondary battery cell 10 to more effectively transfer heat between the secondary battery cell 10 and the secondary battery cell 10. However, this is only an example, and a heat transfer material may not be provided between the bottom member 22 and the secondary battery cell 10 of the present disclosure and the secondary battery cell 10 may be in direct contact with the bottom member 22.

In addition, the housing 20 may include a sidewall member 24, a front member 25, a rear member 26, a cover member 23, and the like, to accommodate the secondary battery cell 10 in a surrounding shape.

The bottom member 22 may be disposed in a lower end portion of the secondary battery cell 10. The sidewall member 24 may be provided on a corner of the bottom member 22. The front member 25 may be provided in the front edge of the housing 20 and may be connected to a front bus bar member 21 coupled to an electrode lead 11 on one side of the secondary battery cell 10. The rear member 26 may be provided at the rear edge of the housing 20, and may be connected to the rear bus bar member 21 coupled to an electrode lead 11 on the other side of the secondary battery cell 10. The cover member 23 may be provided on the upper ends of the sidewall member 24, the front member 25, and the rear member 26, and may be configured to protect an upper end portion of the secondary battery cell 10.

The bottom member 22 may be configured to transfer heat, generated by the secondary battery cell 10, to an external heat sink to be cooled. The side wall member 24 may also discharge the heat, generated by the secondary battery cell 10, to an external entity.

In addition, the housing 20 may be provided with a buffer pad member between the secondary battery cells 10 or between the secondary battery cell 10 and the sidewall member 24 to buffer swelling of the secondary battery cell 10.

The guard unit 30 may serve to delay swelling or bursting of the sealing portion 13 of the secondary battery cell 10. The guard unit 30 will be described with reference to FIGS. 2 to 4.

Figure 2:
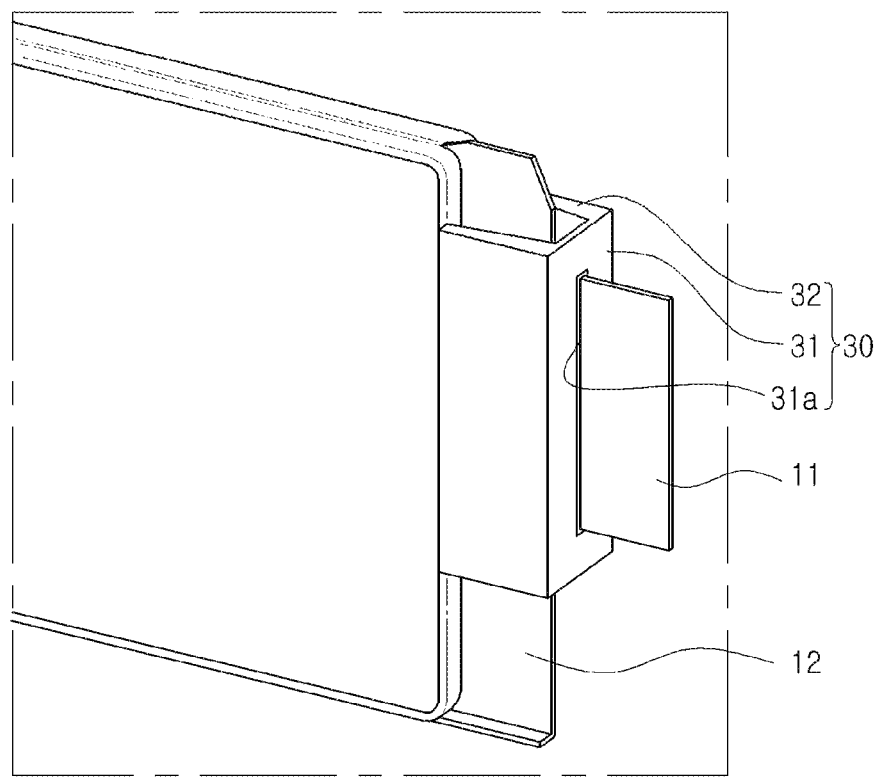
FIG. 2 is a perspective view illustrating only one secondary battery cell and a corresponding guard unit separated from a battery module according to an example embodiment of the present disclosure.
Figure 3:
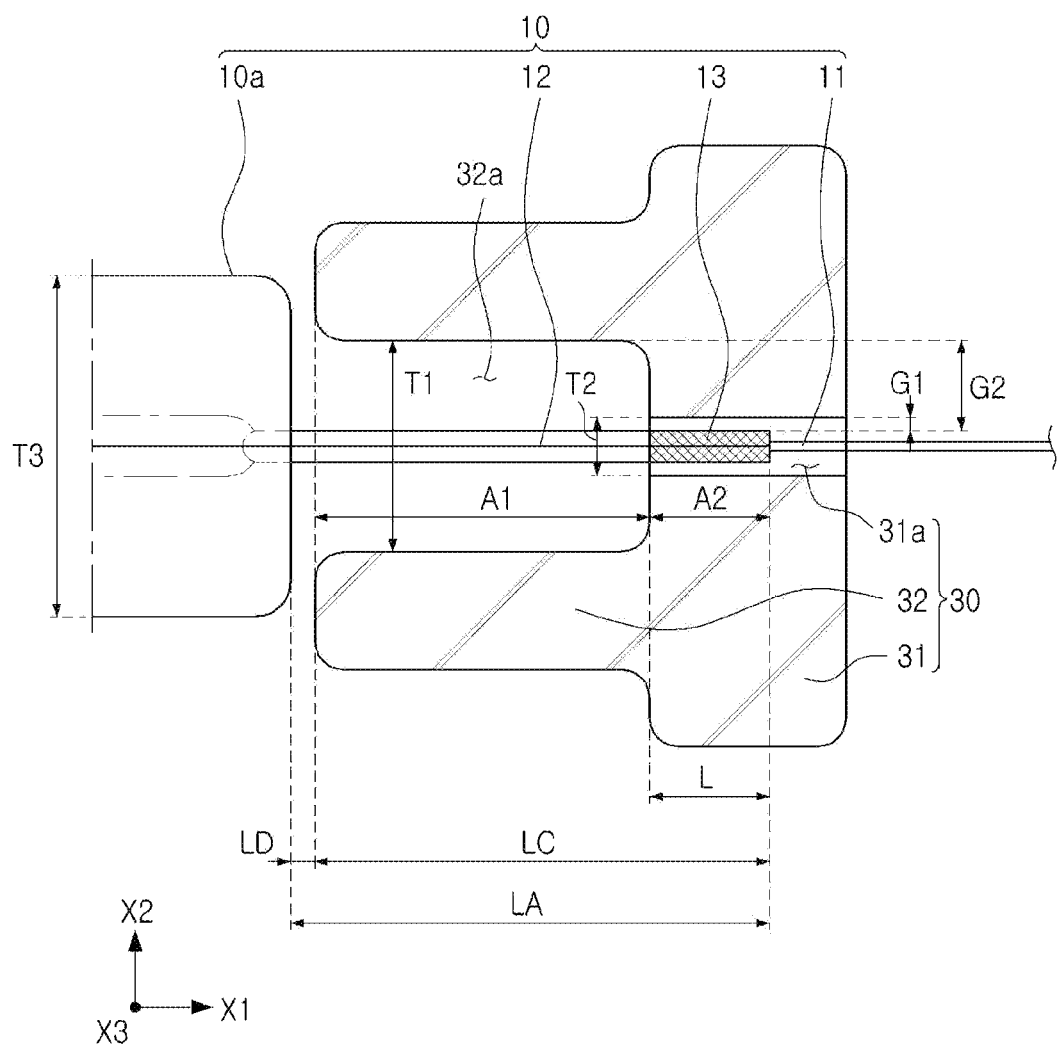
FIG. 3 is a cross-sectional view illustrating only a guard unit and a secondary battery cell in a battery module according to an example embodiment of the present disclosure.
Figure 4:
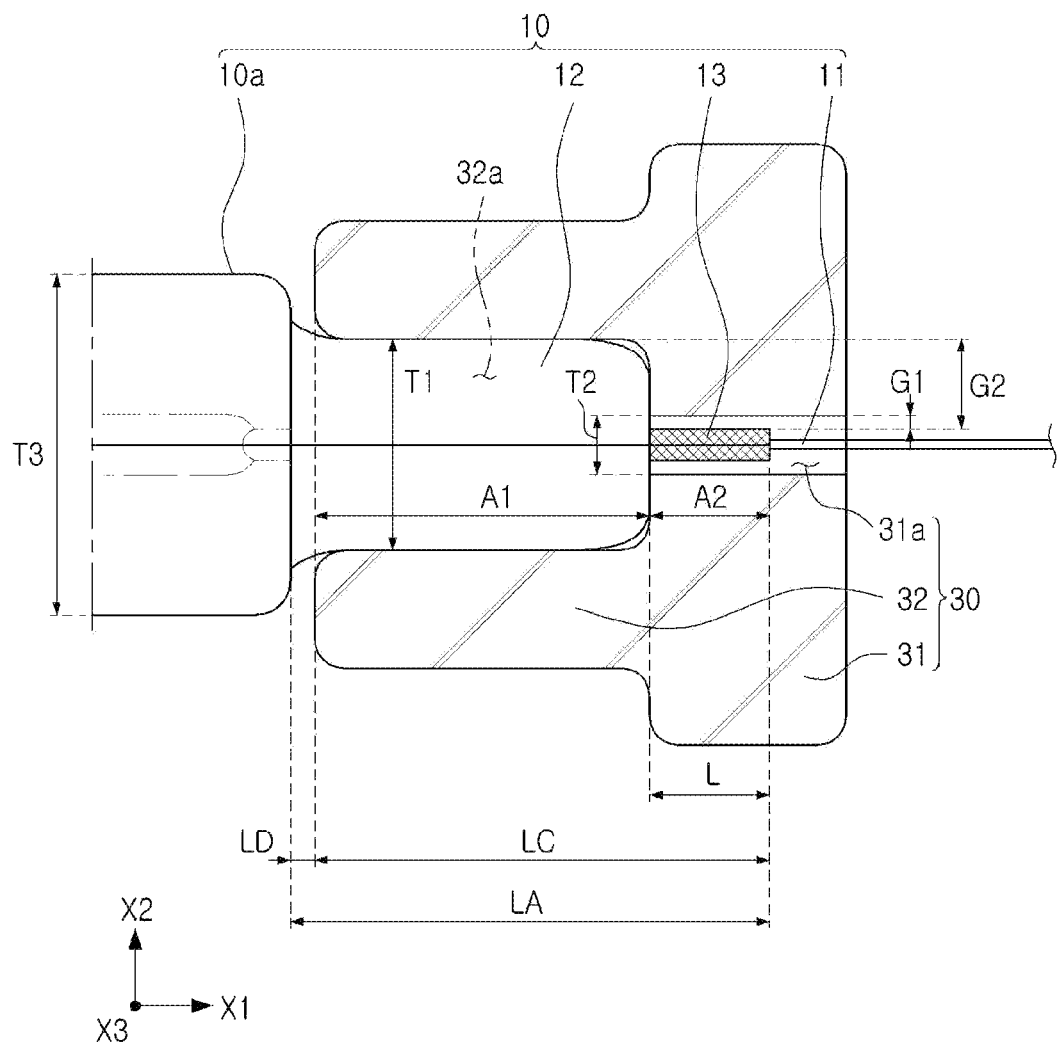
FIG. 4 is a cross-sectional view illustrating a state in which a terrace portion of the secondary battery cell of FIG. 3 swells.

FIG. 2 is a perspective view illustrating only one secondary battery cell 10 and a corresponding guard unit 30 separated from a battery module according to an example embodiment, FIG. 3 is a cross-sectional view illustrating only a guard unit 30 and a secondary battery cell 10 in a battery module according to an example embodiment, and FIG. 4 is a cross-sectional view illustrating a state in which a terrace portion 12 of the secondary battery cell 10 of FIG. 3 swells. In FIGS. 3 and 4, an exterior of the secondary battery cell 10 is illustrated for ease and clarity of the drawings.

Referring to FIGS. 2 to 4, the guard unit 30 may be configured such that the terrace portion 12 extends within a limited range but the expansion of the sealing portion 13 is limited as much as possible. For example, the guard unit 30 may be provided such that a gap G1 from the sealing portion 13 is smaller than the distance G2 from the terrace portion 12, and thus, a space for expansion of the sealing portion 13 may be provided to be relatively small while a space for expansion of the terrace portion 12 may be provided in a range smaller than the thickness T3 of the cell body member 10a.

In this case, the sealing of the sealing portion 13 may be maintained while accommodating the gas, generated inside the secondary battery cell 10, in a space secured by the expansion of the terrace portion 12. Accordingly, explosion of the secondary battery cell 10 caused by gas venting may be prevented. The guard unit 30 of the battery module according to an example embodiment may include a first block member 31 and a second block member 32.

A slit hole 31a, into which the sealing portion 13 is inserted, may be formed in the first block member 31. The second block member 32 may be integrated with the first block member 31, and may face the terrace portion 12. An opening 32a, through which the sealing portion 13 and the terrace portion 12 enter, may be formed in the second block member 32. A gap G1 between the sealing portion 13 and an internal surface of the slit hole 31a may be smaller than a gap G2 between the terrace portion 12 and an internal surface of the second block member 32.

For example, since the gap G1 between the first block member 31 and the sealing portion 13 is relatively small, the expansion of the sealing portion 13 may be suppressed, and since the gap G2 between the second block member 32 and the terrace portions 12 is relatively large, the expansion of the terrace portion 12 may be performed within a space between internal surfaces of the first block member 32.

Accordingly, the sealing of the sealing portion 13 may be maintained while accommodating the gas, generated inside the secondary battery cell 10, in the space secured by the expansion of the terrace portion 12.

The gap G1 between the sealing portion 13 and the internal surface of the slit hole 31a of the battery module according to an example embodiment may be equal to at least 0.5 times or less of a length L at which the sealing portion 13 is inserted into the slit hole 31a.

For example, in the battery module according to an example embodiment, there may also be a gap G1 between the sealing portion 13 and the slit hole 31a of the first block member 31.

Accordingly, the sealing portion 13 may also be expanded by the gas generated in the secondary battery cell 10. However, a gap G1 at which the sealing portion 13 may be expanded, that is, a gap G1 between the sealing portion 13 and the slit hole 31a, may be 0.5 times or less of the length L at which the sealing portion 13 is inserted. In addition, when the sealing portion 13 is split due to introduction of gas, it may be gradually split from one end portion of the sealing portion 13, coupled to the terrace portion 12, to the other end portion of the sealing portion 13 adjacent to an external side.

A maximum distance, at which one end of the sealing portion 13 may be spaced apart from an original position as one end portion of the sealing portion 13 is split, may be the gap G1 between the sealing portion 13 and the slit hole 31a. In addition, the gap G1 may be less than half of the length L at which the sealing portion 13 is inserted.

Accordingly, even when one end portion of the sealing portion 13 is split to the maximum, the other end portion of the sealing portion 13 is not split. Therefore, the sealing can be maintained in the other end portion of the sealing portion 13.

Referring to FIGS. 3 and 4, the guard unit 30 may be divided into a first area A1, corresponding to the terrace portion 12, and a second area A2 facing the sealing portion 13. For example, the guard unit 30 may be installed to face both at least a portion of the terrace portion 12 and at least a portion of the sealing portion 13. In this case, a first gap T1 is a distance between internal surfaces in the first area A1, and a second gap T2 is a distance between internal surfaces in a second area A2. The first gap T1 may correspond to a space in which the terrace portion 12 may be expanded, and the second gap T2 may correspond to a space in which the sealing portion 13 may be expanded. Since the guard unit 30 is provided with a second block member 32 forming an opening 32a, the first gap T1 between the internal surfaces in the first area A1 facing the terrace portion 12 may be smaller than a thickness T3 of the cell body member 10a due to the thickness of the second block member 32. Accordingly, a thickness of the expanded terrace portion 12 may be limited to the first gap T1 between the internal surfaces of the first area A1 facing the terrace portion 12.

The battery module according to the prior art has a problem in which the terrace portion of the secondary battery cell swells, and then the sealing portion is rapidly opened (burst) due to force applied from the swelling terrace portion to the sealing portion. However, according to example embodiments of the present disclosure, since the thickness of the expanded terrace portion 12 is limited within a certain range (for example, T1), rapid opening of the sealing portion 13 caused by excessive expansion of the terrace portion 12 may be prevented and delay gas venting.

In addition, due to the thickness of the first block member 31, the guard unit 30 may be formed such that a second gap T2 between the internal surfaces in the second area A2 facing the sealing portion 13 is smaller than the thickness T3 of the cell body member 10a. Accordingly, a range in which the sealing portion 13 expands may be limited.

As illustrated in FIGS. 3 and 4, the guard unit 30 may be formed such that a second gap T2 between the internal surfaces in the second area A1 facing the sealing portion 13 is smaller than the first gap T1 between the internal surfaces of the first area A1 facing the terrace portion 12.

In addition, the first gap T1 between the internal surfaces in the first area A1 facing the terrace portion 12 may have a value greater than a thickness of the terrace portion 12 such that the terrace portion 12 enters the opening 32a of the guard unit 30.

Figure 5:
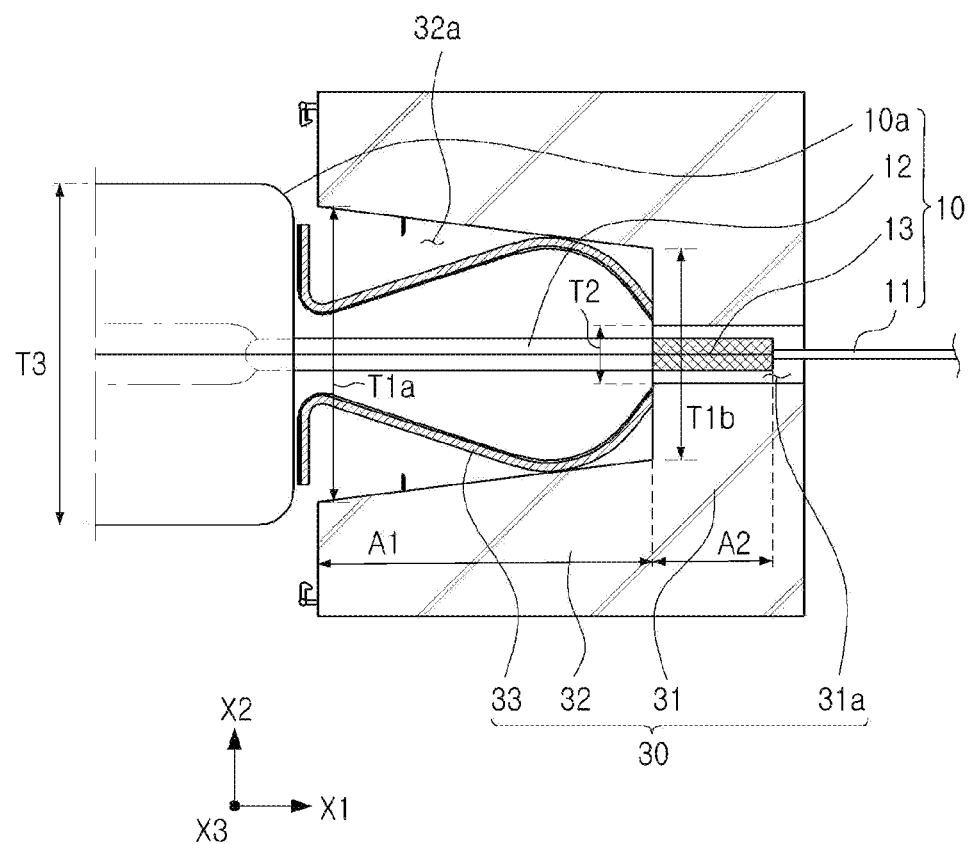
FIG. 5 is a cross-sectional view illustrating a guard unit including an extension guide member in a battery module according to an example embodiment of the present disclosure.
Figure 6:
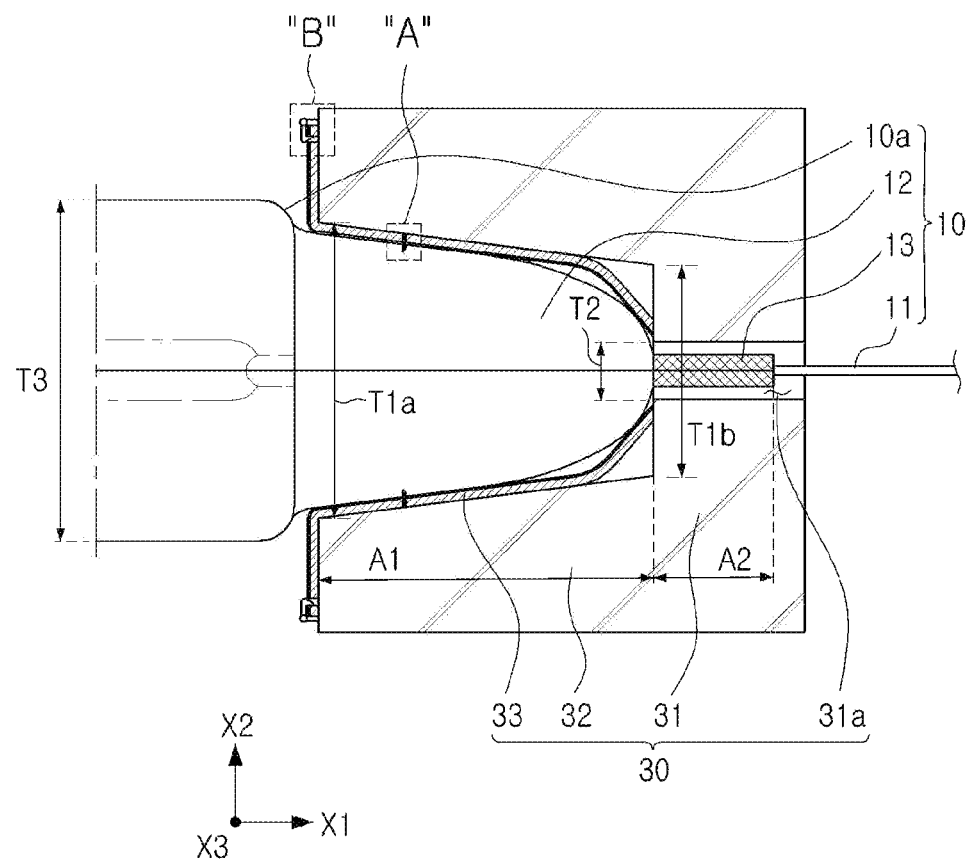
FIG. 6 is a cross-sectional view illustrating a state in which a terrace portion of the secondary battery cell of FIG. 5 swells.

The guard unit 30 may have a structure in which the first gap T1 between the internal surfaces in the first area A1 facing the terrace portion 12 and/or the second gap T2 between the internal surfaces in the second area A1 facing the sealing portion 13 varies (see FIGS. 5 and 6). As described above, when the gaps T1 and T2 between the internal surfaces of the guard member 30 vary, each and average gap may be considered. For example, an average gap between the internal surfaces in the second area A1 facing the sealing portion 13 may be smaller than an average gap between the internal surfaces in the first area A1 facing the terrace portion 12. In this case, the average gap (average value) may be defined as a value obtained by summing the gaps T1 and T2 between the internal surfaces of the guard member 30 and dividing a value, obtained by the sum, by a length of each area.

In addition, the guard unit 30 may limit the expansion of the terrace portion 12 and the sealing portion 13 in the first area A1 facing the terrace portion 12 and the second area A1 facing the sealing portion 13 within a predetermined range. In this case, an expansion limitation length LC of the terrace portion 12 and the sealing portion 13 of the guard unit 30 may correspond to a sum of the lengths corresponding to the terrace portion 12 and the sealing portion 13, based on a length direction (an X1 direction) of the cell body member 10a.

In this case, to limit the expansion range of the terrace portion 12, the guard unit 30 may have a shape facing at least half of an entire length LA of the terrace portion 12 and the sealing portion 13. For example, the expansion limitation length LC of the guard unit 30 may have a value of 50% (half) or more of the total length LA of the terrace portion 12 and the sealing portion 13. In addition, the expansion limitation length LC of the guard unit 30 may have a value of 60% or more, 70% or more, 80% or more, or 90% or more of the total length LA of the terrace portion 12 and the sealing portion 13. When the expansion limitation length LC is reduced, a distance LD between a side surface of the cell body member 10a and the guard unit 30 may be increased, and thus, an area of the terrace portion 12, in which an expansion thickness is not limited, may be increased.

In addition, the guard unit 30 may be installed to face the entire sealing portion 13 to limit expansion of the entire sealing portion 13, in a length direction (an X1 direction) of the cell body member 10a.

In the second block member 32 of the battery module according to an example embodiment, a corner, adjacent to the cell body member 10a, of a portion facing the terrace portion 12 may be formed to have a round shape (round corner).

As described above, the second block member 32 may have a round shape on a side of the corner adjacent to the cell body member 10a to further secure the expansion space of the terrace portion 12.

In addition, the second block member 32 may include a round shape on the side of the corner adjacent to the cell body member 10a to prevent the terrace portion 12 from being in close contact with the corner portion, or the like, and bursting during the expansion of the terrace portion 12.

In addition, the second block member 32 of the battery module according to an example embodiment may be provided on both sides of the terrace portion 12. Therefore, the first gap T1 between the internal surfaces in the first area A1 facing the terrace portion 12 may have a value smaller than the thickness T3 of the cell body member 10a due to the thickness of the second block member 32.

Accordingly, the second block member 32 may induce an expansion shape of the terrace portion 12 while securing a portion of the expansion spaces of opposite side surfaces of the terrace portion 12. For example, the second block member 32 may induce uniform expansion of the opposite side surfaces of the terrace portion 12 without asymmetric expansion of one side surface of the terrace portion 12. Accordingly, an expansion space may be secured to the maximum extent while preventing the terrace portion 12 from swelling or bursting.

FIG. 5 is a cross-sectional view illustrating a case in which a guard unit 30 includes an extension guide member 33 in a battery module according to an example embodiment, and FIG. 6 is a cross-sectional view illustrating a state in which a terrace portion 12 of the secondary battery cell 10 of FIG. 5 swells. In FIGS. 5 and 6, an exterior of the secondary battery cell 10 is illustrated for ease and clarity of the drawings.

Referring to the drawings, the guard unit 30 of the battery module according to an example embodiment may further include an extension guide member 33. The guard unit 30 illustrated in FIGS. 5 and 6 has the same configuration as the guard unit 30 described with reference to FIGS. 2 to 4, except that it further includes the extension guide member 33. The extension guide member 33 may be made of a flexible material. Therefore, to avoid unnecessary duplication, descriptions of the same or similar components will be omitted and will be replaced with the descriptions of FIGS. 2 to 4.

The extension guide member 33 may be formed such that one end portion thereof is coupled to the first block member 31 and the other end portion thereof extends to the second block member 32. According to the expansion of the terrace portion 12, the other end portion of the extension guide member 33 may be elastically moved in a direction of the second block member 32. For example, the extension guide member 33 may be elastically moved in a thickness direction X2 of the cell body member 10a.

As described above, the expansion of the terrace portion 12 may be guided by the extension guide member 33 during expansion. For example, an expansion shape and expansion pressure of the terrace portion 12 may be adjusted by the extension guide member 33.

Accordingly, the terrace portion 12 may be prevented from bursting due to an impact caused by sudden extension of the terrace portion 12. For example, the terrace portion 12 may be induced to gradually extend to be prevented from swelling or busting.

In addition, a movement of the extension guide member 33 may be limited within a range smaller than a thickness of the cell body member 10a to limit expansion thickness of the terrace portion 12. For example, gaps T1a and T1b between internal surfaces in the first area A1 facing the terrace portion 12 may be smaller than the thickness T3 of the cell body member 10a due to a thickness of the second block member 32 and a thickness of the extension guide member 36. Accordingly, the expansion thickness of the terrace portion 12 may be limited within a range smaller than the gaps T1a and T1b between the internal surfaces in the first area A1 facing the terrace portion 12.

In addition, the guard unit 30 illustrated in FIGS. 5 and 6 may have a shape in which the gaps T1a and T1b between the internal surfaces of the first area A1 facing the terrace portion 12 vary. In this case, an average gap between the internal surfaces in the first area A1 facing the terrace portion 12 may be greater than an average distance between the internal surfaces in the second area A1 facing the sealing portion 13.

In addition, the guard unit 30 may be formed such that a gap T2 between the internal surfaces in the second area A1 facing the sealing portion 13 is smaller than the gaps T1a and T1b between the internal surfaces in the first area A1 facing the terrace portion 12.

The extension guide member 33 of the battery module according to an example embodiment may be formed to have a shape in which a central portion facing the terrace portion 12 includes a round surface.

For example, since the extension guide member 33 includes a round surface on a corner side adjacent to the cell body member 10a, an expansion space of the terrace portion 12 may be further secured.

In addition, since the extension guide member 33 includes a round shape on the edge side adjacent to the cell body member 10a, the terrace portion 12 may be prevented from being brought into close contact with a corner portion, or the like, and bursting when the terrace portion 12 expands.

Figure 7:
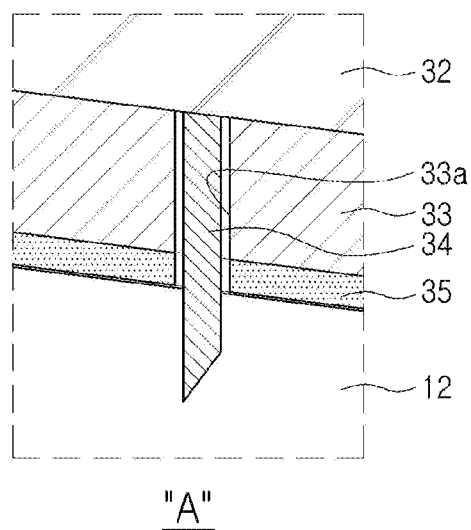
FIG. 7 is an enlarged cross-sectional view of portion "A" of FIG. 6.
Figure 8:
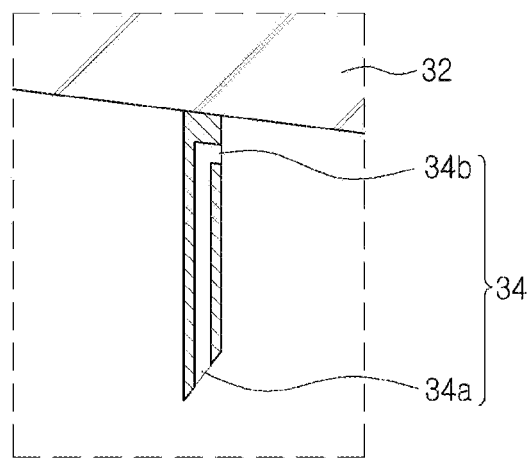
FIG. 8 is a cross-sectional view illustrating a modified embodiment of FIG. 7 in which a needle member is in the form of a tube.

FIG. 7 is an enlarged cross-sectional view of portion "A" of FIG. 6, and FIG. 8 is a cross-sectional view illustrating a modified embodiment of FIG. 7 in which a needle member 34 is in the form of a tube.

Referring to the drawings, the guard unit 30 of the battery module according to an example embodiment may further include a needle member 34.

The needle member 34 may be coupled to the second block member 32, and may protrude in a direction of the terrace portion 12. The needle member 34 may be disposed to pass through a through-hole 33a, formed in the extension guide member 33, to perforate the expanding terrace portion 12.

As described above, the needle member 34 may serve to perforate a portion of the expanding terrace portion 12 to discharge the gas inside the terrace portion 12 to an external entity.

The needle member 34 may be configured to intentionally and constantly vent the gas, generated in the secondary battery cell 10, in the battery module according to the present disclosure. For example, the needle member 34 may perforate the terrace portion 12 to prevent explosion caused by sudden gas venting.

In addition, the needle member 34 of the battery module according to an example embodiment may be provided in the form of a tube in which an internal hollow is formed, and an introduction hole 34a may be formed to be perforated in a front tip portion of the needle member 34 and a discharge hole 34b may be formed in a central portion of the needle member 34 such that the internal hollow communicates with an external entity.

The needle member 34 may be provided in the form of a general column having no hollow therein as illustrated in FIG. 7, or may be provided in the form of a tube having an internal hollow as illustrated in FIG. 8.

When the needle member 34 is provided in the form of a tube and is provided with the introduction hole 34a and the discharge hole 34b, the gas inside the terrace portion 12 may be discharged to the discharge hole 34b through the introduction hole 34a. For example, even when the needle member 34 is not removed after passing through the terrace portion 12, the gas inside the terrace portion 12 may be discharged.

In addition, the guard unit 30 of the battery module according to an example embodiment may include a reinforcing pad member 35.

The reinforcing pad member 35 may be provided on one surface of the extension guide member 33 facing the terrace portion 12, and an adhesive material may be applied to bond the expanding terrace portion 12.

As described above, the reinforcing pad member 35 may be bonded to the terrace portion 12 when the terrace portion 12 expands. In addition, the terrace portion 12 may be prevented from tearing and bursting even when a portion of the terrace portion 12 is perforated by the needle member 34 as the pad member is bonded to the terrace portion.

Figure 9:
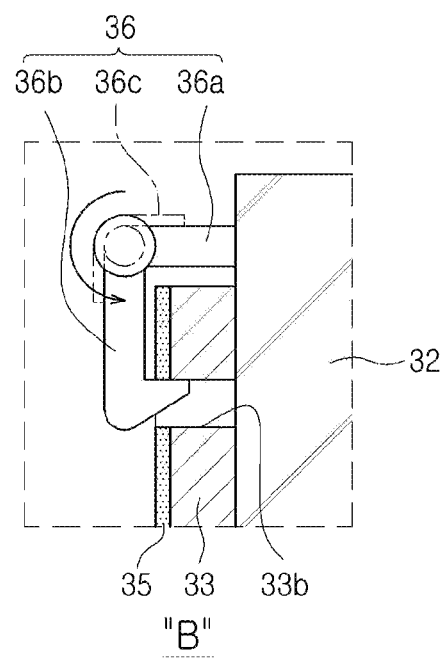
FIG. 9 is an enlarged cross-sectional view of portion "B" portion of FIG. 6.

FIG. 9 is an enlarged cross-sectional view of portion "B" in FIG. 6. Referring to the drawing, the guard unit 30 of the battery module according to an example embodiment may include a holding member 36.

The holding member 36 may be provided on the second block member 32, and the other end portion of the extension guide member 33 moved in the direction of the second block member 32 may be locked on the holding member 36 to be fixed.

For example, the holding member 36 may be provided to fix the extension guide member 33, so that the extension guide member 33 does not press the terrace portion 12 after the terrace portion 12 expands.

Accordingly, after intentional venting occurs, the shape of the welling terrace portion 12 may be maintained to significantly reduce exposure of the perforated portion to external air.

On the other hand, when the holding member 36 is not provided, the terrace portion 12 pressed by the extension guide member 33 may return to the original shape thereof and the perforated portion perforated by the needle member 34 may be exposed as it is. Accordingly, due to circulation of an inside of the secondary battery cell 10 and the external air, introduction of oxygen into the secondary battery cell 10 or leakage of an electrolyte inside the secondary battery cell 10 to an external entity may become more severe.

As a result, the battery module according to the present disclosure may include the holding member 36 to address the above issue.

To this end, the holding member 36 of the battery module according to an example embodiment may include, for example, a support tab portion 36a and a hook portion 36b.

The support tab portion 36a may be coupled to the second block member 32. One end portion of the hook portion 36b may be hingedly coupled to the support tab portion 36a, and the other end portion thereof may be in the form of a wedge to be fitted into a fixing hole 33b formed in the extension guide portion and may be pressed in a direction of the second block member 32 by an elastic member 36c provided in the support tab portion 36a.

Accordingly, as the extension guide member 33 approaches the second block member 32 due to the expansion of the terrace portion 12, the other end portion of the extension guide member 33 may be moved between the other end of the hook portion 36b and an external surface of the second block member 32. In addition, when the other end portion of the extension guide member 33 is completely in close contact with the second block member 32, the other end portion of the wedge-shaped hook portion 36b may be locked on the fixing hole 33b, formed in the other end portion of the extension guide member 33, to be fitted thereinto.

Figure 10:
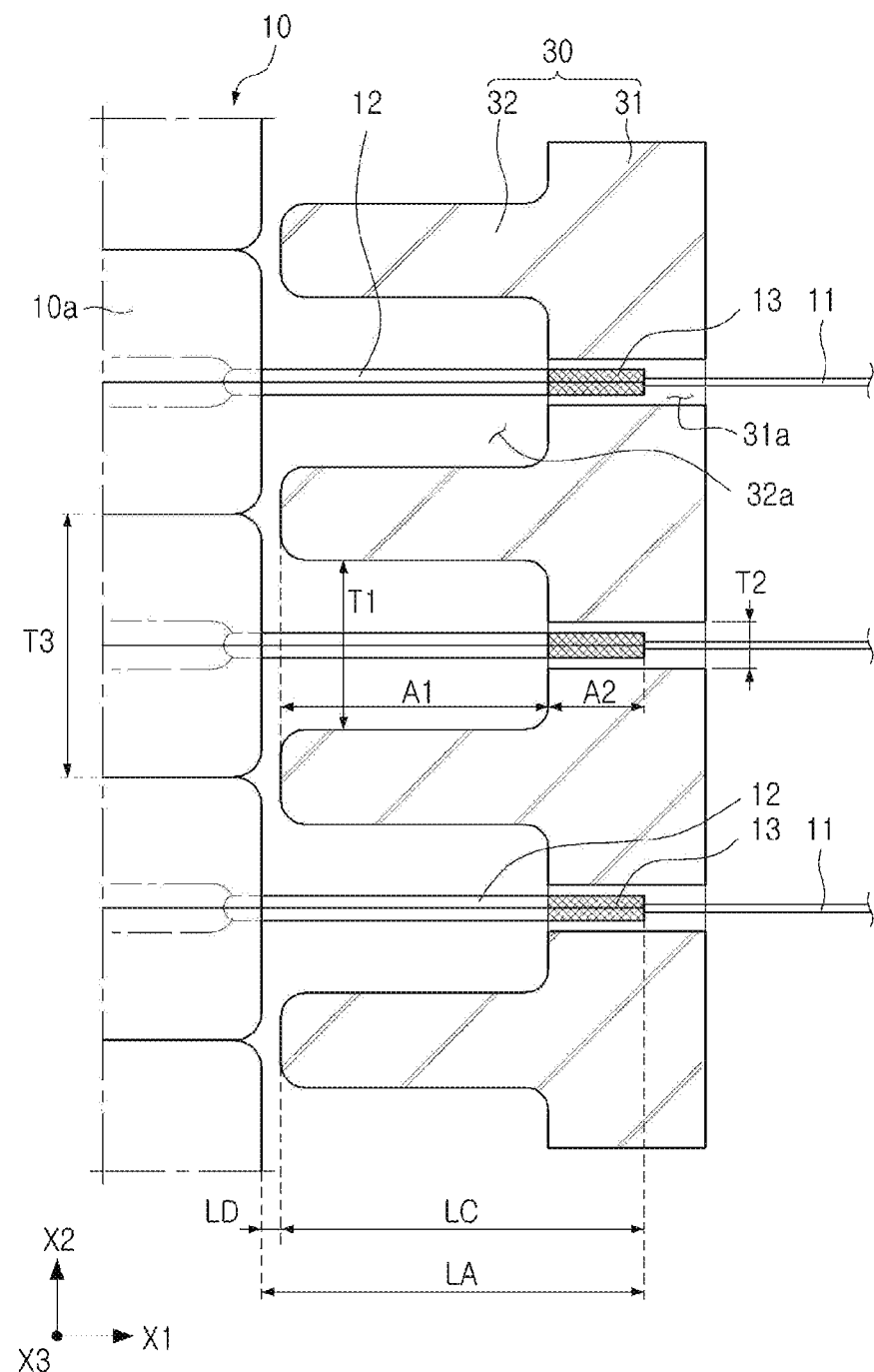
FIG. 10 is a cross-sectional view illustrating a state in which a plurality of guard units and a plurality of secondary battery cells, illustrated in FIG. 3, are installed.

FIG. 10 is a cross-sectional view illustrating a state in which a plurality of guard units 30 and a plurality of secondary battery cells 10, illustrated in FIG. 3, are installed. FIG. 3 illustrates a state in which the guard units 30 are disposed on opposite sides of the terrace portion 12 of one secondary battery cell 10, while FIG. 10 illustrates a state in which the guard unit 30 illustrated in FIG. 3 includes a plurality of units connected to each other. An example of the guard unit 30 illustrated in FIG. 10 is the same as the example of the guard unit 30 illustrated in FIG. 3, except that a plurality of units have an integrated shape. Therefore, the same or similar detailed description of the configuration will be replaced with the above description, and only differences will be described.

As illustrated in FIG. 10, the guard unit 30 may include a plurality of units disposed between the terrace portions 12 of adjacent secondary battery cells 10, and the plurality of units may constitute an integrated guard unit 30. When the integrated guard unit 30 is used, an advantage for easily installing the guard unit 30 may be obtained. In addition, as illustrated in FIG. 1, the integrated guard unit 30 may be integrated with the bus bar member 21 to be embedded in the bus bar member 21.

As illustrated in FIG. 10, the guard unit 30 may be disposed between the terrace portions 12 in a state of being separated from the bus bar member (21 of FIG. 1) to which the electrode lead 11 is coupled. For example, the guard unit 30 and the bus bar member 21 may be separately configured. Alternatively, the guard unit 30 may be disposed between the terrace portions 12 in a state of being coupled to the bus bar member 21 (for example, an integrated state) as illustrated in FIG. 1.

Figure 11A:
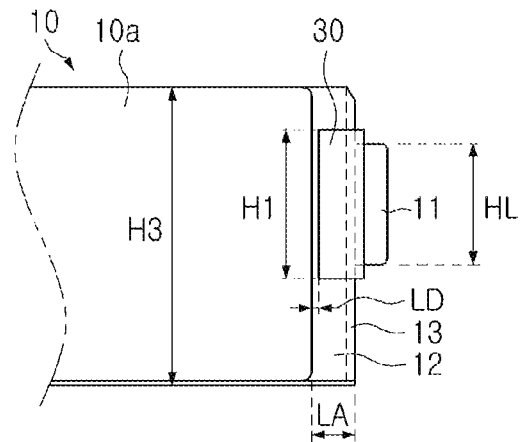
FIGS. 11A to 11C are side views illustrating a state in which a guard unit is coupled to a secondary battery cell.
Figure 11B:
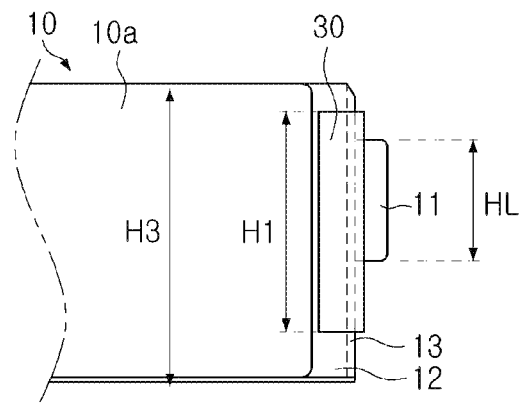
Figure 11C:
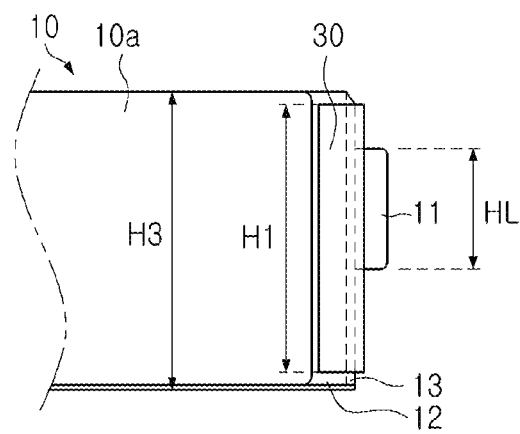

FIGS. 11A to 11C are side views illustrating a state in which a guard unit 30 is coupled to a secondary battery cell 10, and FIG. 11A illustrates the guard unit 30 and the secondary battery cell 10 illustrated in FIG. 2, and FIGS. 11B and 11C illustrate a modified example in which a height of the guard unit 30 is increased, as compared with FIG. 11A.

As illustrated in FIG. 11A, the guard unit 30 may be installed to face a portion, in which an electrode lead 11 is disposed, of the terrace portion 12 and the sealing portion 13. A height H1 of the guard unit 30 has a value greater than that of a height HL of the electrode lead 11I such that the guard unit 30 overall corresponds to the portion in which the electrode lead 11 is disposed. A portion, in which the electrode lead 11 is exposed to an external entity, of the sealing portion may have relatively weak bonding strength, as compared with the other portions of the sealing portion 13. According to an example embodiment, expansion of the terrace portion 12 may be limited through the guard unit 30 to delay the swelling or bursting of the sealing portion 13 in the portion in which the electrode lead 11 is exposed to the external entity.

The height H1 of the guard unit 30 may have a value of half or more of the height H3 of the cell body member 10a, as illustrated in FIG. 11B. In addition, the guard unit 30 may be installed to have a height similar to or the same as a height H3 of a cell body member 10a, as illustrated in FIG. 11C. As described above, when a height of the guard unit 30 is increased, the expansion of the terrace portion 12 may be suppressed in a large area to delay the swelling or bursting of the sealing portion 12.

In addition, to limit an expansion range of the terrace portion 12, the guard unit 30 may have a shape facing at least 50% (half) of a total length LA of the terrace portion 12 and the sealing portion 13. The guard unit 30 may have a shape facing 60% or more, 70% or more, 80% or more, or 90% or more of the total length LA. When an area in which the guard unit 30 covers the terrace portion 12 is decreased, a distance LD between a side surface of the cell body member 10a and the guard unit 30 may be increased. Thus, an area of the terrace portion 12, in which an expansion thickness is not limited, may be increased.

Figure 12:
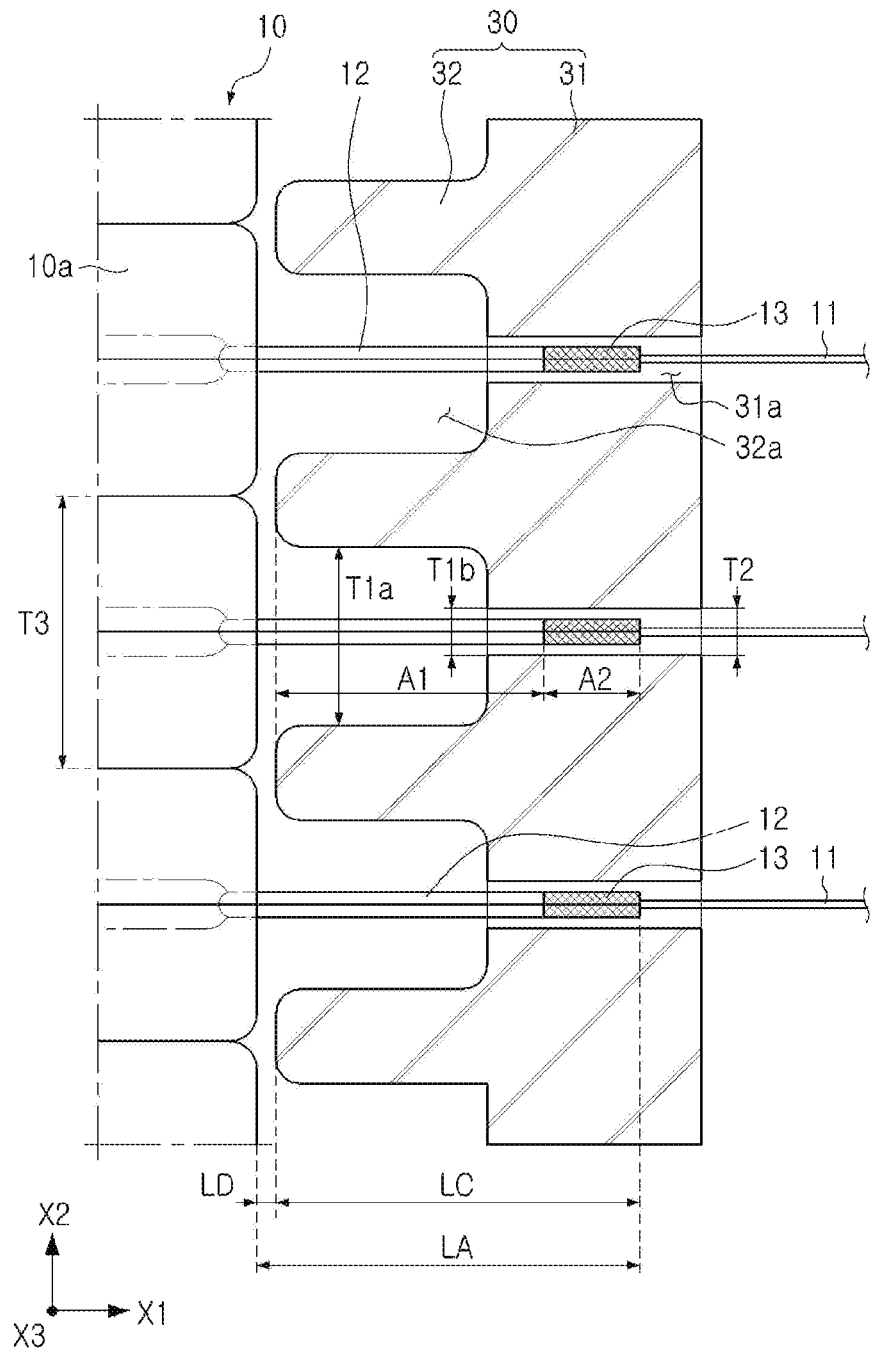
FIGS. 12 to 16 are cross-sectional views illustrating various modified examples of a guard unit.

FIG. 12 is a cross-sectional view illustrating a modified example of the guard unit 30. A guard unit 30 illustrated in FIG. 12 is different from the guard unit 30 illustrated in FIG. 10 only in that positions of a terrace portion 12 and a sealing portion 13 are different from each other. To avoid unnecessary duplication, descriptions of the same or similar components will be omitted and will be replaced with the descriptions of FIGS. 3 to 10.

The guard unit 30 illustrated in FIG. 12 may include a first area A1, facing at least a portion of the terrace portion 12, and a second area A2 installed to face the sealing portion 13.

First gaps T1a and T1b are distances between internal surfaces of the first area A1. Since the first gaps T1a and T1b are smaller than a thickness T3 of a cell body member 10a, an expansion thickness of the terrace portion 12 may be limited to delay venting of gas inside the battery cell 10. In addition, a second gap T2 is a distance between internal surfaces of a second area A2. Since the second gap T2 also has a value smaller than a value of the thickness T3 of the cell body member 10a, an expansion thickness of a sealing portion may be limited.

The first gaps T1a and T1b may vary within the first area A1. For example, a distance T1a between internal surfaces of the guard member 30 on one side close to the cell body member 10a in the first area A1 may have a value different from a value of a distance T1b between internal surfaces of the guard member 30 on the other side of the first area A1. In this case, a minimum value T1b of the first gap may have the same value as the second gap T2. For example, the distance T1b between the internal surfaces of the guard member 30 on the other side of the first area A1 close to the electrode lead 11 may be the same as the second gap T2. In addition, an average value of the first gap may have a value higher than a value of the second gap T2. The average value of the first gap may be obtained from a value obtained by integrating the gap between the internal surfaces of the guard member 30 and dividing the value, obtained by the integration, by a length of the first area A1.

The guard unit 30 may include a first block member 31, having a slit hole 31a into which the sealing portion 13 is inserted, and a second block member 32 having an opening 32a facing at least a portion of the terrace portion 12. The first area A1 may be formed across an opening 32a and the slit hole 31a.

In the guard unit 30 illustrated in FIG. 12, the expanded thickness of the terrace portion 12 may be limited by the first gaps T1a and T1b between the internal surfaces in the first area A1 facing the terrace portion 12. Accordingly, rapid opening of the sealing portion 13, caused by excessive expansion of the terrace portion 12, may be reduced to delay gas venting of the secondary battery cell 10.

Figure 13:
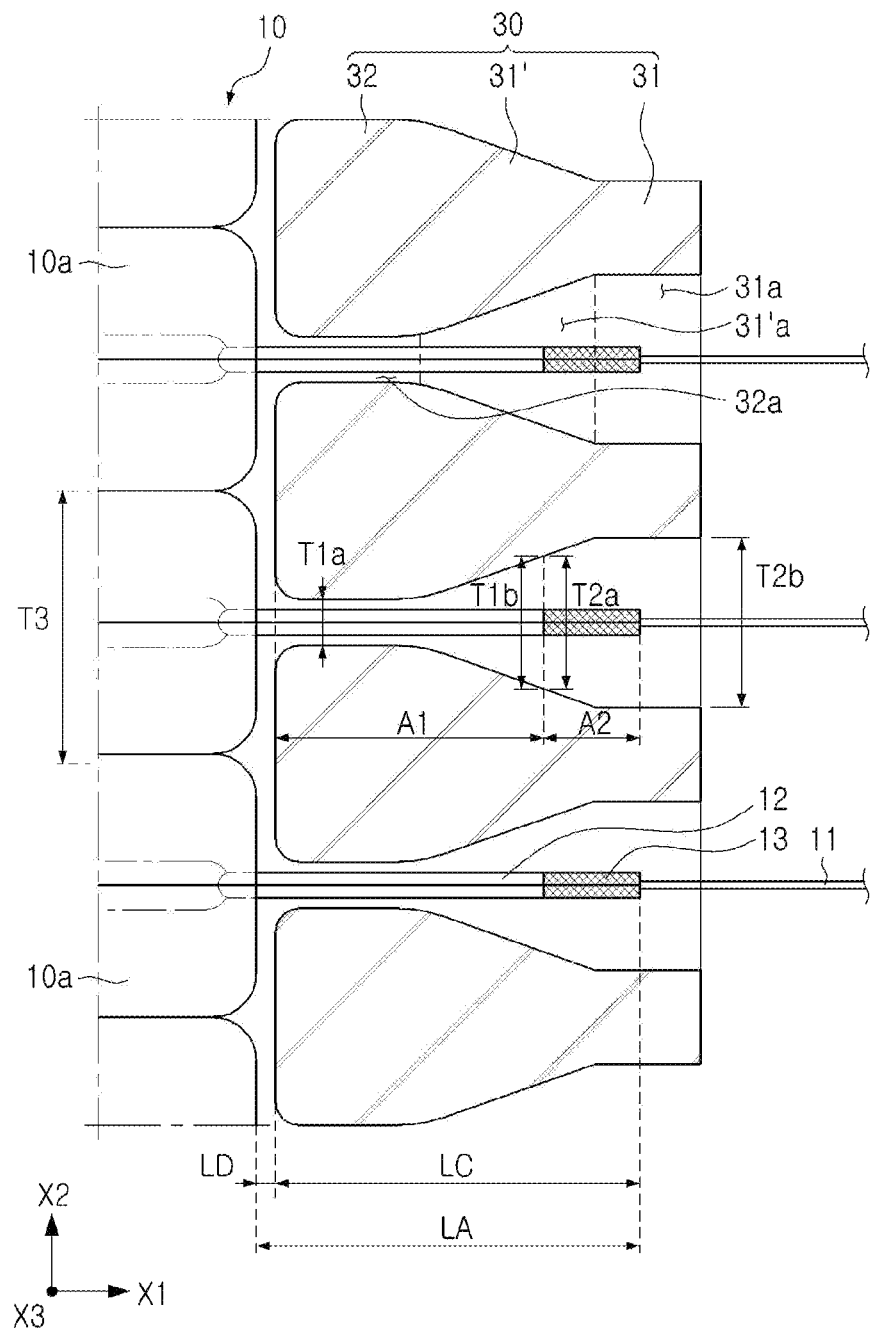

FIG. 13 is a cross-sectional view illustrating another modified example of the guard unit 30. A guard unit 30 illustrated in FIG. 13 may has a different arrangement of gaps between internal surfaces of first and second areas A1 and A2, as compared with the guard unit 30 illustrated in FIG. 12. To avoid unnecessary duplication, descriptions of the same or similar components will be omitted and will be replaced with the descriptions of FIGS. 3 to 10.

The guard unit 30 illustrated in FIG. 13 may include a first area A1, facing at least a portion of a terrace portion 12, and a second area A2 facing a sealing portion 13.

First gaps T1a and T1b are distances between internal surfaces of the first area A1. Since the first gaps T1a and T1b are smaller than a thickness T3 of a cell body member 10a, an expansion thickness of the terrace portion 12 may be limited to delay venting of gas inside a secondary battery cell 10. Second gaps T2a and T2b are distances between internal surfaces of the second area A2. Since the second gaps T2a and T2b also have a smaller value than the thickness T3 of the cell body member 10a, an expansion thickness of a sealing portion may be limited.

The second gaps T2a and T2b may have a value greater than or equal to a value of the first gaps T1a and T1b. In addition, a minimum value T1a of the first gap may be smaller than the value of the second gaps T2a and T2b.

In addition, at least one of the first gaps T1a and T1b and the second gaps T2a and T2b may vary within each of their respective areas A1 and A2. For example, a distance T1a between internal surfaces of the guard member 30 on one side, close to the cell body member 10a, of the first area A1 may have a value different from a value of a distance T1b between internal surfaces of the guard member 30 on the other side of the first area A1. A distance T2a between internal surfaces of the guard member 30, close to the cell body member 10a, of the second area A1 may have a value different from a value of a distance T2b between internal surfaces of the guard member 30 on the other side of the second area A2. In this case, an average value of a second gap may be greater than or equal to an average value of a first gap. An average value of the first and second gaps may be obtained from a value obtained by integrating the gaps between the internal surfaces of the guard member 30 and dividing the value, obtained by the integration, by the lengths of the respective areas A1 and A2.

The guard unit 30 may include a first block member 31 having a slit hole 31a into which the sealing portion 13 is inserted, a second block member 32 having an opening 32a facing at least a portion of the terrace portion 12, and an intermediate block member 31' disposed between the first block member 31 and the second block member 32. A connection opening 31'a, accommodating the sealing portion 13 and the terrace portion 12 together, may be formed in the intermediate block member 31'. In this case, both the first area A1 and the second area A2 may be disposed in the connection opening 31'a. FIG. 13 illustrates a configuration in which an inclined surface is formed in the connection opening 31'a, but the connection opening 31'a may have a step structure between the opening 32a and the slit hole 31a. In addition, the guard unit 30 may be provided with only the first block member 31 and the second block member 32 without being provided with the intermediate block member 31' illustrated in FIG. 13.

In the guard unit 30 illustrated in FIG. 13, the expansion thickness of the terrace portion 12 may be limited to the first gaps T1a and T1b between the internal surfaces in the first area A1 facing the terrace portion 12. Thus, rapid opening of the sealing portion 13, caused by excessive expansion of the terrace portion 12, may be reduced to delay gas venting of the secondary battery cell 10.

Hereinafter, a modified example of the above-described guard unit 30 will be described with reference to FIGS. 14 to 16.

Figure 14:
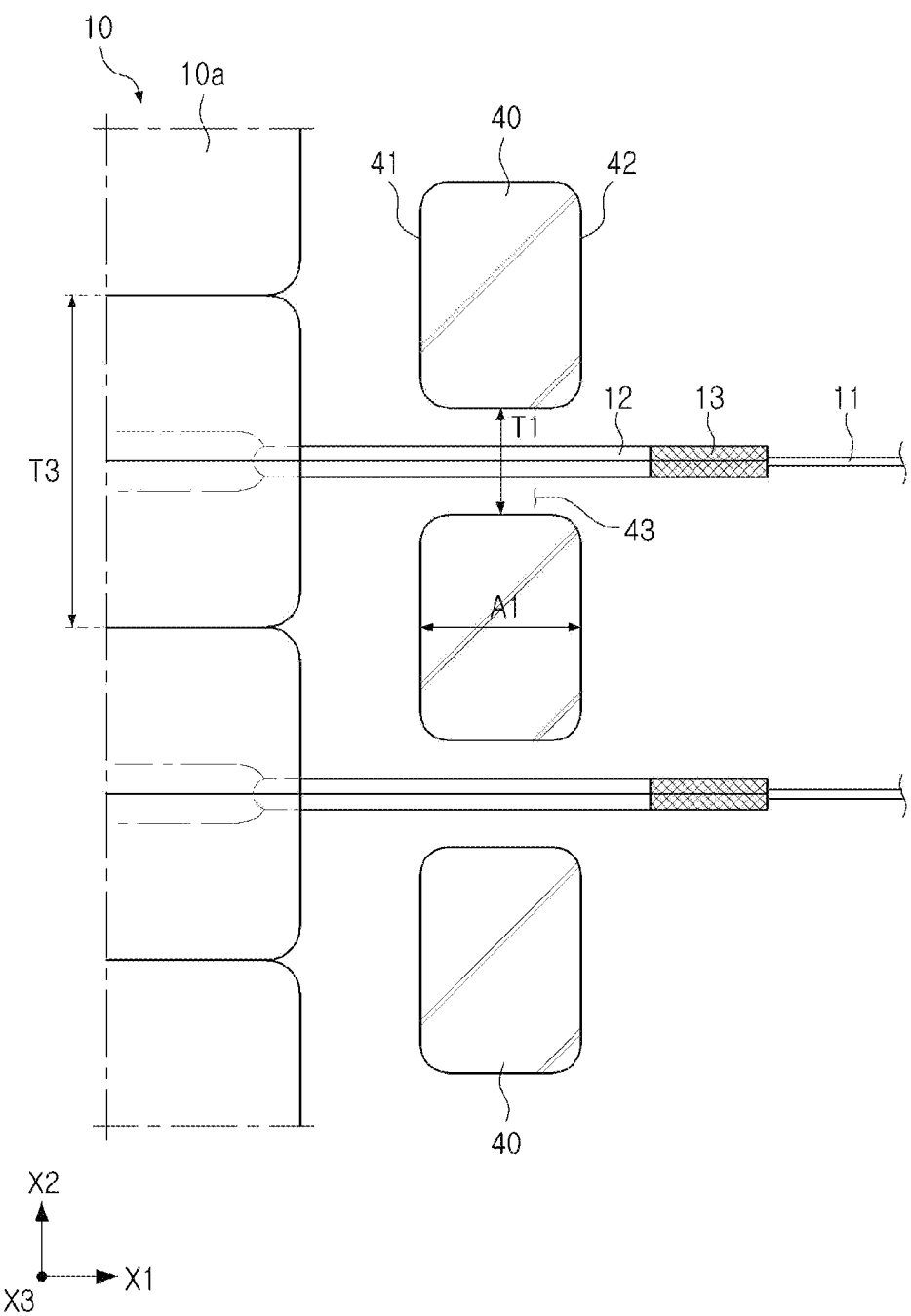
Figure 15:
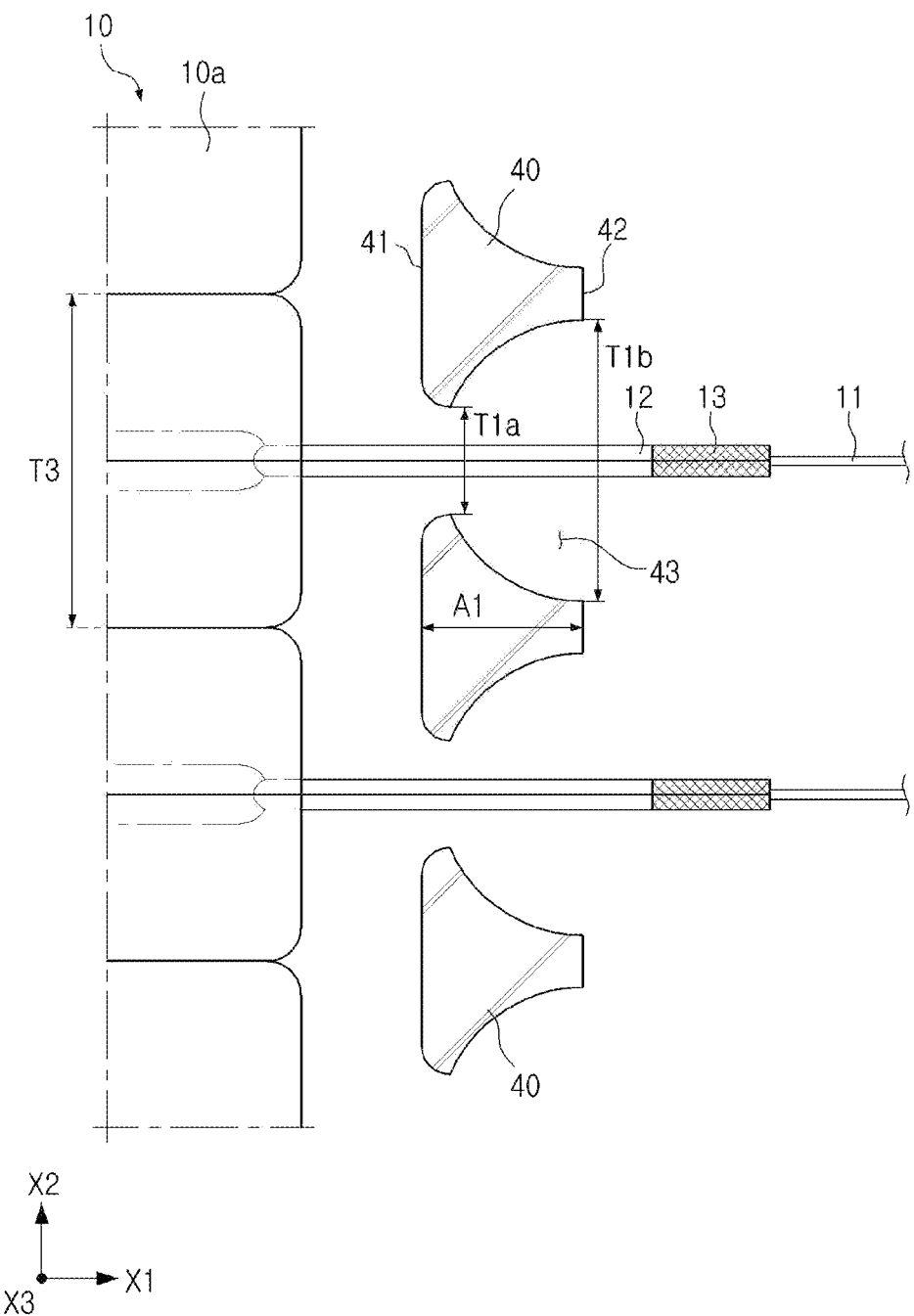
Figure 16:
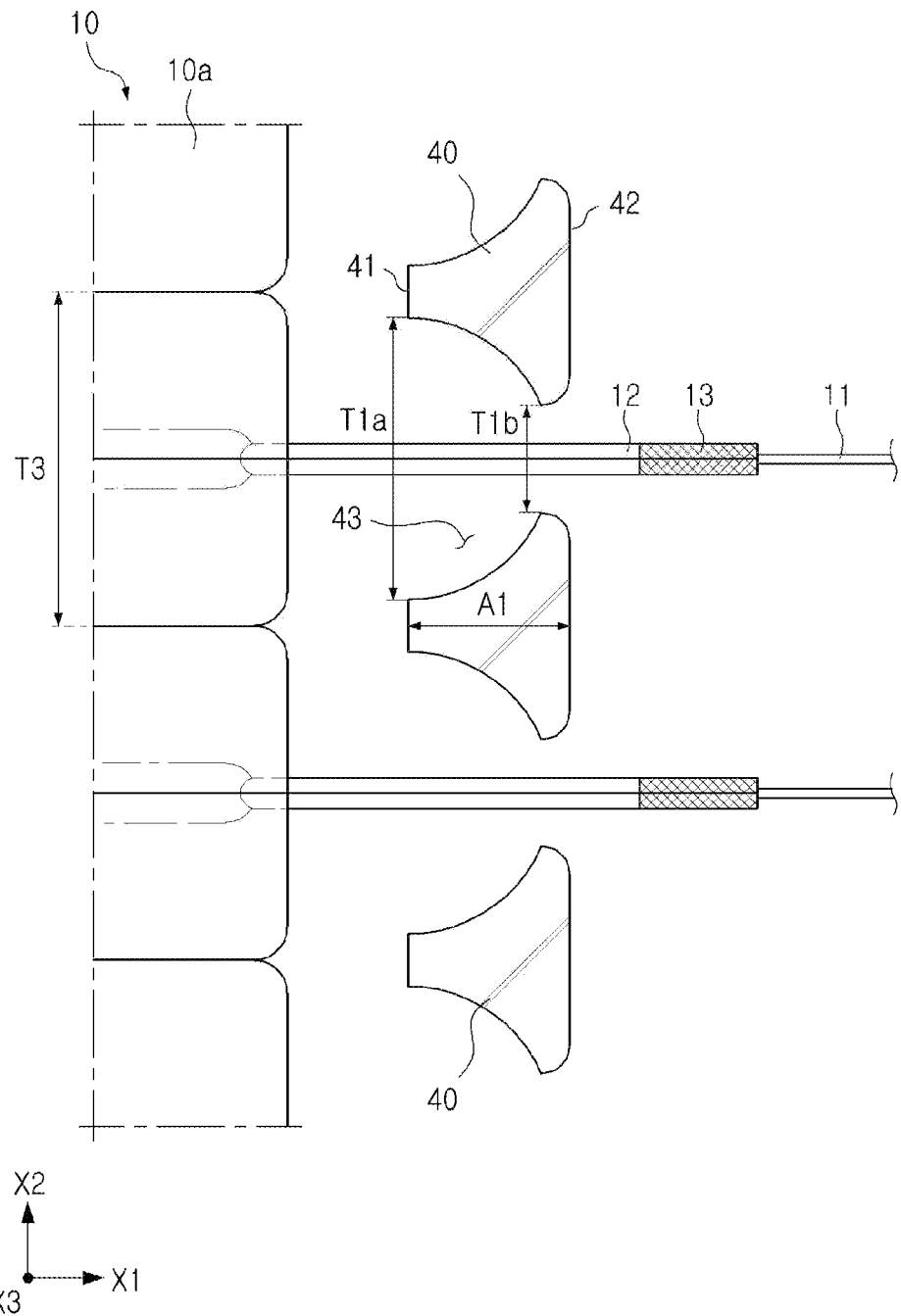

The guard unit 40 illustrated in FIGS. 14 to 16 is configured to include a first area A1 facing at least a portion of a terrace portion 12 to delay swelling or bursting of the sealing portion 13. Unlike the example embodiment illustrated in FIGS. 3 to 6, 10, 12, and 13, the guard unit 40 illustrated in FIGS. 14 to 16 is not provided with an area facing the sealing portion 13.

The guard unit 40 has a shape in which the first gap T1, a distance between internal surfaces of the first area A1, is smaller (or less) than a thickness T3 of a cell body member 10a, so that an expansion thickness of the terrace portion 12 may be limited. For example, even in the case of the guard unit 40 illustrated in FIGS. 14 to 16, rapid opening of the sealing portion 13, caused by excessive expansion of the terrace portion 12, may be reduced to delay gas venting of the secondary battery cell 10.

As illustrated in FIG. 14, the first gap T1 of the guard unit 40 may have a constant value within the first area A1. For example, the guard unit 40 may have the same gap T1 on one side 41 and the other side 42. In this case, the guard unit may be in the form of a bar having a rectangular cross-section.

As illustrated in FIGS. 15 and 16, the first gaps T1a and T1b of the guard unit 40 may be configured to vary within the first area A1. For example, a distance T1a between internal surfaces of the guard member 40 in a portion, adjacent to one side 41 of the first area A1 may have a value different from a value of a distance T1b between internal surfaces of the guard member 40 in a portion, adjacent to the other side 42 of the first area A1. As illustrated in FIG. 15, the first gaps T1a and T1b of the guard unit 40 may have a large value in a portion adjacent to the other side 42 far from the cell body member 10a. Alternatively, as illustrated in FIG. 16, the first gaps T1a and T1b of the guard unit 40 may have a large value in a portion adjacent to one side 41 close to the cell body member 10a. Although not illustrated in the drawings, a first gap between central portions of the one side 41 and the other side 42 may have a largest value.

When the first gaps T1a and T1b of the guard unit 40 vary, an average value of the first gaps may be smaller than a value of a thickness T3 of the cell body member 10a to limit expansion thickness of the terrace portion 12. Similarly, a maximum value of the first gaps may also be smaller than the value of the thickness T3 of the cell body member 10a.

The first gaps T1, T1a, and T1b between internal surfaces in the first area A1, facing the terrace portion 12, may have a value greater than a thickness of the terrace portion 12 such that the terrace portion 12 enters an opening 43 of the guard unit 40.

In addition, the guard unit may be in the form of a bar, and may be disposed between the terrace portions 12 in a state of being separated from the bus bar member (21 of FIG. 1A).

While a 'battery module' has been mainly described in example embodiments of the present disclosure, a 'battery module' according to an example embodiment of the present disclosure is not limited to a conventional battery module accommodated in a battery pack. For example, a 'battery pack' according to the present disclosure may include a battery pack provided with a plurality of secondary battery cells 10 and a battery management system (BMS) in a housing. For example, the 'battery module' according to the present disclosure may have a cell-to-pack structure in which a plurality of secondary battery cells 10 are directly installed inside a pack housing (a housing). In consideration of this, in claims, a 'battery module' according to the present disclosure will be defined as including both conventional battery modules and conventional battery packs.

As described above, a battery module according to the present disclosure may delay gas venting caused by bursting of a sealing portion of a secondary battery cell.

Accordingly, the battery module according to the present disclosure may delay explosion of the secondary battery cell caused by the gas venting.

In addition, by delaying a point in time at which the sealing portion bursts, a point in time at which an electrolyte in the secondary battery cell is evaporated may also be delayed to suppress a rapid decrease in capacity of the secondary battery cell.

In another aspect, a battery module according to the present disclosure may intentionally and constantly vent gas, generated in the secondary battery cell, to prevent explosion caused by rapid gas venting.

While example embodiments have been shown and described above, it will be apparent to those skilled in the art that modifications and variations could be made without departing from the scope of the present disclosure as defined by the appended claims.

For example, the present disclosure may be implemented by deleting some components in the above-described embodiments, and each of the embodiments may be implemented in combination with each other.

What is claimed is:

1. A battery module comprising:
a plurality of secondary battery cells, each including at least one electrode lead connected to an electrode assembly, a terrace portion forming a periphery of a cell body member in which the electrode assembly is accommodated, and a sealing portion formed to be connected to the terrace portion, the terrace portion including a first terrace portion disposed at a portion where the electrode lead is exposed, the sealing portion including a first sealing portion disposed between the electrode lead exposed outwardly and the first terrace portion;
a housing in which the plurality of secondary battery cells are accommodated; and
a guard unit installed to face at least a portion of the first terrace portion and at least a portion of the first sealing portion to delay expanding or bursting of the first sealing portion of at least one of the plurality of secondary battery cells, wherein:
in the guard unit, a gap between internal surfaces facing the first terrace portion corresponds to a space in which the first terrace portion is expandable and is formed to be smaller than a thickness of the cell body member to limit expansion thickness of the first terrace portion,
the guard unit comprises a block member having an opening through which the first sealing portion and the first terrace portion enter in a first direction and having a slit hole into which the first sealing portion is inserted in the first direction, the first direction being a direction in which the first sealing portion and the first terrace portion extend,
the block member comprises a first part disposed in a first side of the opening and the slit hole and a second part disposed in a second side of the opening and the slit hole, the second side being opposite to the first side,
the first part and the second part are integrally formed into one body, and
the block member has a shape in which both ends of the block member do not extend to a full height of the first terrace portion in a second direction, leaving top and bottom portions of the first terrace portion exposed, the second direction being perpendicular to the first direction and the thickness direction of the battery cell.

2. The battery module of claim 1, wherein:
in the guard unit, a gap between internal surfaces facing the first sealing portion is formed to be smaller than the thickness of the cell body member.

3. The battery module of claim 1, wherein:
in the guard unit, a gap between internal surfaces facing the first sealing portion is formed to be smaller than the gap between the internal surfaces facing the first terrace portion.

4. The battery module of claim 1, wherein:
in the guard unit, an average gap between internal surfaces facing the first sealing portion is formed to be smaller than an average gap between the internal surfaces facing the first terrace portion.

5. The battery module of claim 1, wherein:
the guard unit has a shape facing half or more of a total length of the first terrace portion and the first sealing portion, in a length direction of the cell body member.

6. The battery module of claim 1, wherein:
the guard unit is installed to face an entirety of the first sealing portion, based on a length direction of the cell body member.

7. The battery module of claim 1, wherein:
the guard unit comprises:
a first block member in which the slit hole is formed;
a second block member in which the opening is formed to face at least a portion of the first terrace portion, the second block member being integrated with the first block member; and
wherein a gap between the first sealing portion and an internal surface of the slit hole is smaller than a gap between the first terrace portion and an internal surface of the opening.

8. The battery module of claim 7, wherein:
the gap between the first sealing portion and the internal surface of the slit hole is equal to at least 0.5 times or less of a length at which the first sealing portion is inserted into the slit hole.

9. The battery module of claim 7, wherein:
in the second block member, a corner, adjacent to the cell body member, of a portion facing the first terrace portion is formed to have a round shape.

10. The battery module of claim 7, wherein:
the second block member is provided on opposite sides of the first terrace portion.

11. The battery module of claim 1, wherein:
the guard unit comprises:
an extension guide member elastically moved in a thickness direction of the cell body member according to expansion of the first terrace portion; and
a movement of the extension guide member is limited within a range smaller than a thickness of the cell body member to limit expansion thickness of the first terrace portion.

12. The battery module of claim 11, wherein:
the guard unit further comprises:
a first block member in which the slit hole is formed; and
a second block member in which the opening is formed to face at a portion of the first terrace portion, the second block member being integrated with the first block member; and
the extension guide member has a first end portion, coupled to the first block member, and a second end portion extending to the second block member.

13. The battery module of claim 12, wherein:
the guard unit further comprises:
a needle member coupled to the second block member, protruding in a direction of the first terrace portion, and disposed to pass through a through-hole, formed in the extension guide member, to perforate the first terrace portion.

14. The battery module of claim 13, wherein:
the needle member is provided in a form of a tube in which an internal hollow is formed, and an introduction hole is formed to be perforated in a front tip portion of the needle member and a discharge hole is formed in a central portion of the needle member such that the internal hollow communicates with an external entity.

15. The battery module of claim 12, wherein:
the guard unit further comprises:
a holding member, provided on the second block member, on which the second end portion of the extension guide member moved in a direction of the second block member is locked to be fixed.

16. The battery module of claim 15, wherein:
the holding member comprises:
a support tab coupled to the second block member; and
a hook pressed in a direction of the second block member by an elastic member provided in the support tab, wherein a first end portion of the hook is hingedly coupled to the support tab and a second end of the hook is in the form of a wedge to be fitted into a fixing hole formed in the extension guide member.

17. The battery module of claim 11, wherein:
the guard unit further comprises:
a reinforcing pad member provided on one surface of the extension guide member facing the first terrace portion and applied with an adhesive material bonding an expanding portion of the first terrace portion.

18. The battery module of claim 1, wherein:
the guard unit is installed to face a portion, in which the at least one electrode lead is disposed, of the first sealing portion.

19. The battery module of claim 1, wherein:
each secondary battery cells comprises:
an insulating member disposed between the edge of the cell body member and the at least one electrode lead to cover the at least one electrode lead.

20. A battery module comprising:
a plurality of secondary battery cells, each including electrode leads connected to an electrode assembly, a terrace portion forming a periphery of a cell body member in which the electrode assembly is accommodated, and a sealing portion formed to be connected to the terrace portion, the terrace portion including a first terrace portion disposed at a portion where the electrode lead is exposed, the sealing portion including a first sealing portion disposed between the electrode lead exposed outwardly and the first terrace portion;
a housing in which the plurality of secondary battery cells are accommodated;
an integrated guard unit installed to face at least a portion of the first terrace portion and at least a portion of the first sealing portion to delay expanding or bursting of the first sealing portion of the secondary battery cell and integrated to correspond to each of the plurality of secondary battery cells; and
at least one bus bar member in which the integrated guard unit is embedded, wherein:
the integrated guard unit is formed such that a gap between internal surfaces facing the first terrace portion corresponds to a space in which the first terrace portion is expandable and is formed to be smaller than a thickness of the cell body member to limit expansion thickness of the first terrace portion;
the electrode leads of the plurality of secondary battery cells are electrically connected to the bus bar member, and the integrated guard unit comprises a block member having a plurality of openings through which the first sealing portion and the first terrace portion of each secondary battery cell enter in a first direction and having a plurality of slit holes into which the first sealing portion of each secondary battery cell is inserted in the first direction, the first direction being a direction in which the first sealing portion and the first terrace portion extend, the block member comprises a first part disposed in a first side of each opening and each slit hole and a second part disposed in a second side of each opening and each slit hole, the second side being opposite to the first side, the first part and the second part are integrally formed into one body, and the block member has a shape in which both ends of the block member do not extend to a full height of the first terrace portion in a second direction, leaving top and bottom portions of the first terrace portion exposed, the second direction being perpendicular to the first direction and the thickness direction of the battery cell.

21. A battery module comprising:

a plurality of secondary battery cells, each including at least one electrode lead connected to an electrode assembly, a terrace portion forming a periphery of a cell body member in which the electrode assembly is accommodated, and a sealing portion formed to be connected to the terrace portion, the terrace portion including a first terrace portion disposed at a portion where the electrode lead is exposed, the sealing portion including a first sealing portion disposed between the electrode lead exposed outwardly and the first terrace portion;

a housing in which the plurality of secondary battery cells are accommodated; and a guard unit installed to face at least a portion of the first terrace portion and at least a portion of the first sealing portion to delay expanding or bursting of the first sealing portion of at least one of the plurality of secondary battery cells, wherein:

in the guard unit, a first space for expansion of the first sealing portion is formed to be smaller than a second space for expansion of the first terrace portion, the second space corresponding to a space in which the first terrace portion is expandable, the guard unit comprises a block member having a plurality of openings through which the first sealing portion and the first terrace portion enter of each secondary battery cell in a first direction and having a plurality of slit holes into which the first sealing portion of each secondary battery cell is inserted in the first direction, the first direction being a direction in which the first sealing portion and the first terrace portion extend, the block member comprises a first part disposed in a first side of each opening and each slit hole and a second part disposed in a second side of each opening and each slit hole, the second side being opposite to the first side, the first part and the second part are integrally formed into one body, and the block member has a shape in which both ends of the block member do not extend to a full height of the first terrace portion in a second direction, leaving top and bottom portions of the first terrace portion exposed, the second direction being perpendicular to the first direction and the thickness direction of the battery cell.

22. The battery module of claim 21, wherein:

in the guard unit, a gap between internal surfaces, respectively corresponding to the first terrace portion and the first sealing portion, is formed to be smaller than a thickness of the cell body member.

\* \* \* \* \*